United States Patent
Lee et al.

(10) Patent No.: US 12,184,213 B2
(45) Date of Patent: Dec. 31, 2024

(54) MOTOR DRIVING APPARATUS

(71) Applicants: Hyundai Motor Company, Seoul (KR); Kia Corporation, Seoul (KR)

(72) Inventors: Yong Jae Lee, Yongin-si (KR); Jung Mo Yu, Seongnam-si (KR); Jang Yoon Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 312 days.

(21) Appl. No.: 17/840,009

(22) Filed: Jun. 14, 2022

(65) Prior Publication Data
US 2023/0049787 A1 Feb. 16, 2023

(30) Foreign Application Priority Data
Aug. 10, 2021 (KR) .................. 10-2021-0105575

(51) Int. Cl.
*H02P 25/22* (2006.01)
*H02K 3/28* (2006.01)
*H02K 11/33* (2016.01)

(52) U.S. Cl.
CPC .............. *H02P 25/22* (2013.01); *H02K 3/28* (2013.01); *H02K 11/33* (2016.01); *H02K 2213/03* (2013.01)

(58) Field of Classification Search
CPC ...... H02K 3/28; H02K 11/33; H02K 2213/03; H02P 25/22
(Continued)

(56) References Cited

U.S. PATENT DOCUMENTS

| | | | |
|---|---|---|---|
| 2008/0067960 A1* | 3/2008 | Maeda | B62D 5/046 180/443 |
| 2009/0033253 A1 | 2/2009 | Nagashima et al. | |

(Continued)

FOREIGN PATENT DOCUMENTS

| | | |
|---|---|---|
| DE | 11 2018 002 944 T5 | 2/2020 |
| EP | 3 255 783 A1 | 12/2017 |

(Continued)

OTHER PUBLICATIONS

Vector Control Theory Background, Ross Dave, Microchip Technology Inc, Jan. 1, 2004 (Jan. 1, 2004), pp. 1-76, XP093003126.
(Continued)

*Primary Examiner* — Rashad H Johnson
(74) *Attorney, Agent, or Firm* — Morgan, Lewis & Bockius LLP

(57) ABSTRACT

A motor driving apparatus of driving a motor including a plurality of windings respectively corresponding to a plurality of phases is disclosed. The motor driving apparatus includes a first inverter including a plurality of first switching elements and connected to a first end of each of the windings, a second inverter including a plurality of second switching elements and connected to a second end of each of the windings, and a controller electrically connected to the first switching elements and the second switching elements and configured to generate limited pole voltage commands for space vector pulse width modulation based on preset voltage commands of the motor and to distribute the limited pole voltage commands to generate first pole voltage commands for switching of the first switching elements and second pole voltage commands for switching of the second switching elements.

20 Claims, 15 Drawing Sheets

(58) Field of Classification Search
USPC .................................................. 310/68 D, 71
See application file for complete search history.

(56) References Cited

U.S. PATENT DOCUMENTS

| | | | |
|---|---|---|---|
| 2012/0032622 A1 | 2/2012 | Lipo | |
| 2016/0190972 A1* | 6/2016 | Mori | ........................ H02P 21/22 |
| | | | 318/490 |
| 2018/0034406 A1* | 2/2018 | Mitsui | ..................... H02P 27/12 |
| 2019/0296670 A1* | 9/2019 | Omata | ................... H02P 21/22 |
| 2020/0220488 A1* | 7/2020 | Mori | ................... H02M 7/5387 |
| 2023/0006594 A1* | 1/2023 | Saha | ................. H02M 7/53871 |
| 2023/0063318 A1* | 3/2023 | Lee | ...................... H02M 1/0054 |
| 2023/0073159 A1* | 3/2023 | Lee | ......................... H02P 27/08 |
| 2023/0223883 A1* | 7/2023 | Lee | ......................... H02P 21/08 |
| | | | 318/400.02 |
| 2024/0039447 A1* | 2/2024 | Ko | ......................... H02P 27/14 |

FOREIGN PATENT DOCUMENTS

| | | |
|---|---|---|
| JP | 2008-219956 A | 9/2008 |
| JP | 6285256 B2 | 2/2018 |
| KR | 10-2023-0078259 A | 6/2023 |
| WO | 2018/227307 A1 | 12/2018 |

OTHER PUBLICATIONS

Extended European Search Report Dec. 7, 2022, issued in corresponding European Patent Application No. 22181246.4.

* cited by examiner

[Synthesized voltage vector]

[First inverter voltage vector]

[Second inverter voltage vector]

[Synthesized voltage vector]

[First inverter voltage vector]

[Second inverter voltage vector]

MOTOR DRIVING APPARATUS

CROSS-REFERENCE TO RELATED APPLICATION

The present application claims priority to Korean Patent Application No. 10-2021-0105575, filed on Aug. 10, 2021, the entire contents of which is incorporated herein for all purposes by this reference.

BACKGROUND OF THE PRESENT DISCLOSURE

Field of the Present Disclosure

The present disclosure relates to a motor driving apparatus, and more specifically, to an open end winding type motor driving apparatus in which inverters are respectively connected to both ends of a motor winding.

Description of Related Art

In general, one end of a winding of each phase included in a motor is connected to an inverter and the other ends of windings are connected to each other to form a Y connection.

When the motor is driven, a switching element in the inverter is turned ON/OFF according to pulse width modulation control and applies a phase-to-phase voltage to the Y-connected windings of the motor to generate an alternating current. As a result, a torque is generated.

Because the fuel efficiency of eco-friendly vehicles such as electric vehicles that use a torque generated by such a motor as power is determined by the power conversion efficiency of the inverter-motor, it is important to maximize the power conversion efficiency of the inverter and motor efficiency.

The efficiency of an inverter-motor system is determined mainly by the voltage utilization rate of an inverter. When the operating point of a vehicle determined by the relationship between motor speed and torque is formed in a section where the voltage utilization rate is high, the fuel efficiency of the vehicle may be improved.

However, as the number of windings of the motor is increased to increase the maximum torque of the motor, the section where the voltage utilization rate is high becomes far away from a low torque region which is a main operating point of the vehicle, and thus fuel efficiency may deteriorate. Furthermore, in the case of a design in which the section with a high voltage utilization rate includes a main operating point from the viewpoint of fuel efficiency, there is a limitation in the maximum torque of the motor, which may cause a problem that acceleration start performance of the vehicle deteriorates.

To solve such a problem, an open end winding (OEW) type motor driving technique of respectively connecting inverters to both ends of a winding of a motor and driving the two inverters instead of short-circuiting one end of a motor winding through a Y connection has been provided.

This open end winding type motor driving technique has the advantages of increasing a phase voltage to improve the voltage utilization rate and outputting high power as compared to a technique of driving a conventional Y-connected motor.

However, the open end winding type motor driving technique cannot control a zero-phase component voltage to become zero on average in inverter switching periods when a common DC power is applied to the inverters connected to both ends of the windings of the motor, which can cause generation of a common mode current. The present common mode current may act as a loss such as copper loss and iron loss while flowing through the windings of the motor, reducing motor efficiency, and in severe cases, cause damage to the motor system.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving apparatus configured for controlling a zero-phase component voltage as desired by setting the same common mode voltage between two inverters at the time of driving an open end winding type motor in which inverters are respectively connected to both ends of a motor winding to remove a circulating current generated due to a difference, improving motor efficiency.

Various aspects of the present disclosure are directed to providing a motor driving apparatus configured for causing two inverters to instantaneously have the same zero-phase component voltage so that a difference between zero-phase component voltages of the two inverters instantaneously becomes zero at the time of driving an open end winding type motor in which inverters are respectively connected to both ends of a motor winding.

In accordance with various aspects of the present disclosure, the above and other objects may be accomplished by the provision of a motor driving apparatus of driving a motor including a plurality of windings respectively corresponding to a plurality of phases, including a first inverter including a plurality of first switching elements and connected to a first end of each of the windings, a second inverter including a plurality of second switching elements and connected to a second end of each of the windings, and a controller electrically connected to the first switching elements and the second switching elements and configured to generate limited pole voltage commands for space vector pulse width modulation based on preset voltage commands of the motor and to distribute the limited pole voltage commands to generate first pole voltage commands for switching of the first switching elements and second pole voltage commands for switching of the second switching elements.

In various exemplary embodiments of the present disclosure, the controller may perform inverse Clarke/Park transformation on the voltage commands of the motor so that the voltage commands precede or lag behind a rotation angle of the motor by 30 degrees to generate phase voltage commands for the respective phases to generate the limited pole voltage commands.

In various exemplary embodiments of the present disclosure, the controller may be configured to generate an offset voltage corresponding to an average of a maximum value and a minimum value among the phase voltage commands and subtract the offset voltage from the phase voltage commands to generate the limited extreme voltage commands.

In various exemplary embodiments of the present disclosure, an upper limit of the limited pole voltage commands may be "$(\sqrt{3}/2)*Vdc$" and a lower limit of the limited pole voltage commands may be "−(√3/2)*Vdc" (here, "Vdc" is a DC link voltage of the first inverter and the second inverter).

In various exemplary embodiments of the present disclosure, an upper limit of the limited pole voltage commands may be "(√3/2)*Vdc-amp($V_n^*$)" and a lower limit of the limited pole voltage commands may be "−{((√3/2))*Vdc-amp($V_n^*$)}" (here, "Vdc" is a DC link voltage of the first inverter and the second inverter, "$V_n^*$" is a zero-phase component of the voltage commands of the motor, and amp is an operator indicating magnitude).

In various exemplary embodiments of the present disclosure, the controller may multiply the limited pole voltage commands by 1/√3 and add $P_1$ times the zero-phase component of the voltage commands of the motor to the limited pole voltage commands multiplied by 1/√3 to generate the first pole voltage commands, and subtract $P_2$ times the zero-phase component of the voltage commands of the motor from the limited pole voltage commands multiplied by 1/√3 to generate the second pole voltage commands (here, $P_1+P_2=1$).

In various exemplary embodiments of the present disclosure, $P_1$ and $P_2$ may have different values.

In various exemplary embodiments of the present disclosure, when the controller has performed inverse Clarke/Park transformation for preceding the rotation angle of the motor by 30 degrees, the controller may be configured to determine a-phase, b-phase and c-phase components of the first pole voltage commands so that the a-phase, b-phase and c-phase components respectively correspond to a-phase, b-phase and c-phase components of the limited pole voltage commands, and determine a-phase, b-phase and c-phase components of the second pole voltage commands so that the a-phase, b-phase and c-phase components respectively correspond to the b-phase, c-phase and a-phase components of the limited pole voltage commands.

In various exemplary embodiments of the present disclosure, when the controller has performed inverse Clarke/Park transformation for preceding the rotation angle of the motor by 30 degrees, the controller may add $P_1$ times the zero-phase component of the voltage commands of the motor to values obtained by multiplying the a-phase, b-phase and c-phase components of the limited pole voltage commands by 1/√3 to generate the a-phase, b-phase and c-phase components of the first pole voltage commands, and subtract $P_2$ times the zero-phase component of the voltage commands of the motor from values obtained by multiplying the b-phase, c-phase and a-phase components of the limited pole voltage commands by 1/√3 to generate the a-phase, b-phase and c-phase components of the second pole voltage commands.

In various exemplary embodiments of the present disclosure, when the controller has performed inverse Clarke/Park transformation for lagging behind the rotation angle of the motor by 30 degrees, the a-phase, b-phase and c-phase components of the first pole voltage commands respectively correspond to a-phase, b-phase and c-phase components of the limited pole voltage commands, and the a-phase, b-phase and c-phase components of the second pole voltage commands respectively correspond to the c-phase, a-phase and b-phase components of the limited pole voltage commands.

In various exemplary embodiments of the present disclosure, when the controller has performed inverse Clarke/Park transformation for lagging behind the rotation angle of the motor by 30 degrees, the controller may add $P_1$ times the zero-phase component of the voltage commands of the motor to values obtained by multiplying the a-phase, b-phase and c-phase components of the limited pole voltage commands by 1/√3 to generate the a-phase, b-phase and c-phase components of the first pole voltage commands, and subtract $P_2$ times the zero-phase component of the voltage commands of the motor from values obtained by multiplying the c-phase, a-phase and b-phase components of the limited pole voltage commands by 1/√3 to generate the a-phase, b-phase and c-phase components of the second pole voltage commands.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
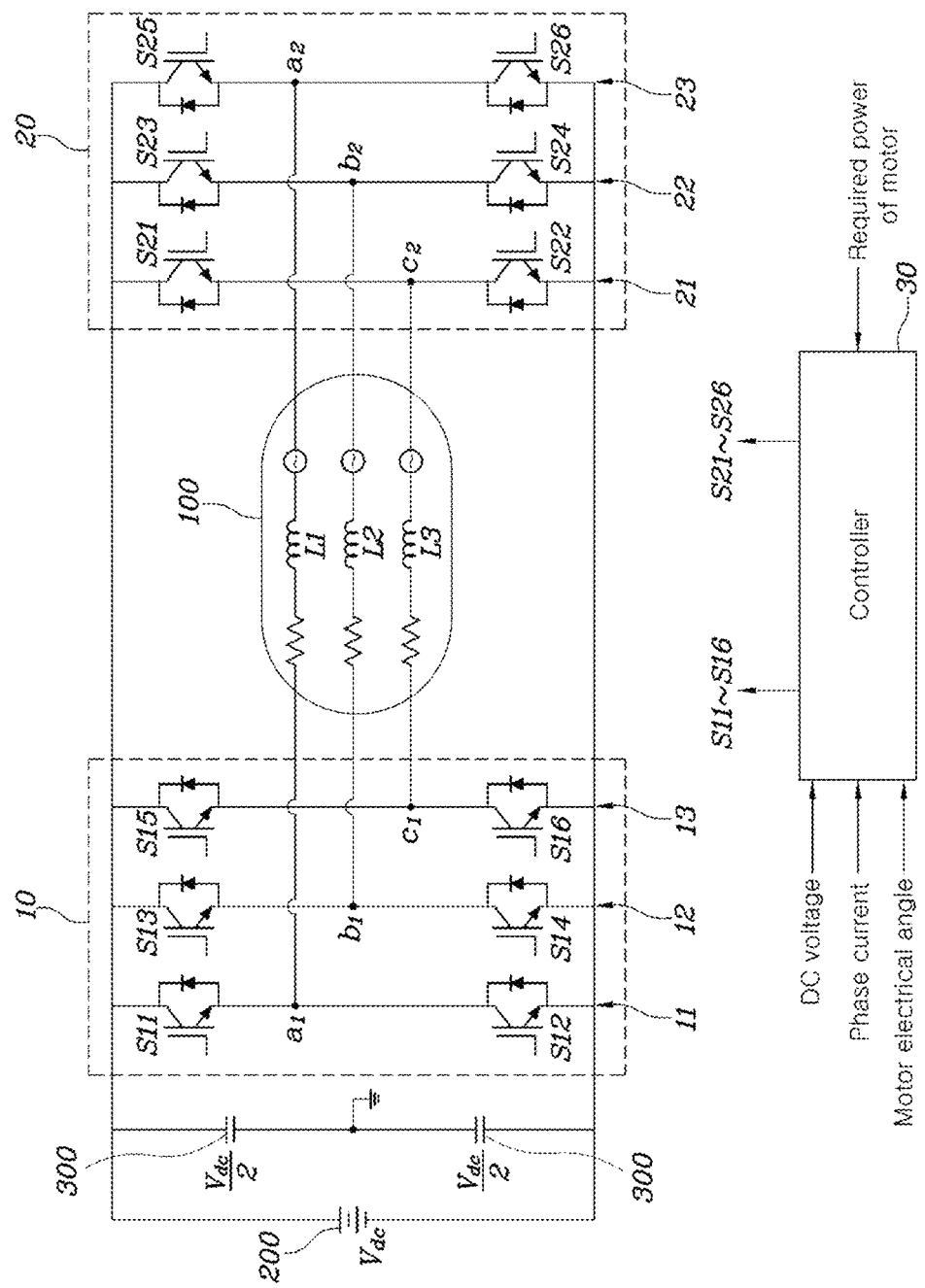
FIG. 1 is a circuit diagram of a motor driving apparatus according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a motor driving apparatus according to various embodiments of the present disclosure will be described in detail with reference to the accompanying drawings.

FIG. 1 is a circuit diagram of a motor driving apparatus according to various exemplary embodiments of the present disclosure.

Referring to FIG. 1, the motor driving apparatus according to various exemplary embodiments of the present disclosure is a motor driving apparatus of supplying driving power to a motor 100 including a plurality of windings L1 to L3 corresponding to a plurality of phases and may include a first inverter 10 including a plurality of first switching elements S11 to S16 and connected to a first end of each winding of the motor 100, a second inverter 20 including a plurality of second switching elements S21 to S26 and connected to a second end of each winding of the motor 100, and a controller 30 that controls pulse width modulation of the first switching elements S11 to S16 and the second switching elements S21 to S26 based on required power of the motor 100.

The first inverter 10 and the second inverter 20 may transform DC power stored in a battery 200 into three-phase AC power and provide the same to the motor 100 or transform regenerative breaking energy generated caused by generation of a regenerative braking torque of the motor 100 during regenerative braking into DC and provide the same to the battery 200. Such transformation between DC power and AC power may be performed by controlling pulse width modulation of the plurality of first switching elements S11 to S16 and the plurality of second switching elements S21 to S26 included in the first inverter 10 and the second inverter 20.

The first inverter 10 may include a plurality of legs 11 to 13 to which a DC voltage formed at a DC link capacitor 300 connected between both ends of the battery 200 is applied. The legs 11 to 13 may respectively correspond to the plurality of phases of the motor 100 to form an electrical connection.

The first leg 11 includes two switching elements S11 and S12 connected in series between both ends of the DC capacitor 300, and a connection node of the two switching elements S11 and S12 may be connected to one end of one winding L1 in the motor 100 so that AC power corresponding to one of the plurality of phases is input/output therethrough.

Similarly, the second leg 12 includes two switching elements S13 and S14 connected in series between both ends of the DC capacitor 300, and a connection node of the two switching elements S13 and S14 may be connected to one end of one winding L2 in the motor 100 so that AC power corresponding to one of the plurality of phases is input/output therethrough.

Furthermore, the third leg 13 includes two switching elements S15 and S16 connected in series between both ends of the DC capacitor 300, and a connection node of the two switching elements S15 and S16 may be connected to one end of one winding L3 in the motor 100 so that AC power corresponding to one of the plurality of phases is input/output therethrough.

The second inverter 20 may have a similar configuration to that of the first inverter 10. The second inverter 20 may include a plurality of legs 21 to 23 to which the DC voltage formed at the DC link capacitor 300 connected between both ends of the battery 200 is applied. The legs 21 to 23 may respectively correspond to the plurality of phases of the motor 100 to form an electrical connection.

The first leg 21 includes two switching elements S21 and S22 connected in series between both ends of the DC capacitor 300, and a connection node of the two switching elements S21 and S22 may be connected to the other end of one winding L1 in the motor 100 so that AC power corresponding to one of the plurality of phases is input/output therethrough.

Similarly, the second leg 22 includes two switching elements S23 and S24 connected in series between both ends of the DC capacitor 300, and a connection node of the two switching elements S23 and S24 may be connected to the other end of one winding L2 in the motor 100 so that AC power corresponding to one of the plurality of phases is input/output therethrough.

Furthermore, the third leg 23 includes two switching elements S25 and S26 connected in series between both ends of the DC capacitor 300, and a connection node of the two switching elements S25 and S26 may be connected to one end of one winding L3 in the motor 100 so that AC power corresponding to one of the plurality of phases is input/output therethrough.

The first inverter 10 is connected to one end of each of the windings L1 to L3 of the motor 100 and the second inverter 20 is connected to the other end of each of the windings L1 to L3 of the motor 100. That is, an open winding type electrical connection in which both ends of the windings L1 to L3 of the motor 100 are connected to the first inverter 10 and the second inverter 20 may be formed.

The controller 30 is an element that controls pulse width modulation of the switching elements S11 to S16 and S21 to S21 included in the first inverter 10 and the second inverter 20 so that the motor 100 may be driven based on required power of the motor 100.

The controller 30 can drive the motor 100 by receiving a DC voltage $V_{dc}$ applied to the first inverter 10 and the second inverter 20, a phase current provided to the motor 100 and detected by a current detector, an electrical angle of the motor detected by a motor rotor detector provided in the motor 100, and the like and switching the first switching elements S11 to S16 of the first inverter 10 and the second switching elements S21 to S26 of the second inverter 20 through pulse width modulation. The controller 30 may apply space vector pulse width modulation (SVPWM) when controlling the first switching elements S11 to S16 and the second switching elements S21 to S26 of the second inverter 20 through pulse width modulation.

To aid in clearer understanding of the motor driving apparatus according to various exemplary embodiments of the present disclosure including the above-described configuration, a method of controlling a conventional open end winding type motor driving apparatus will be described first.

Figure 2:
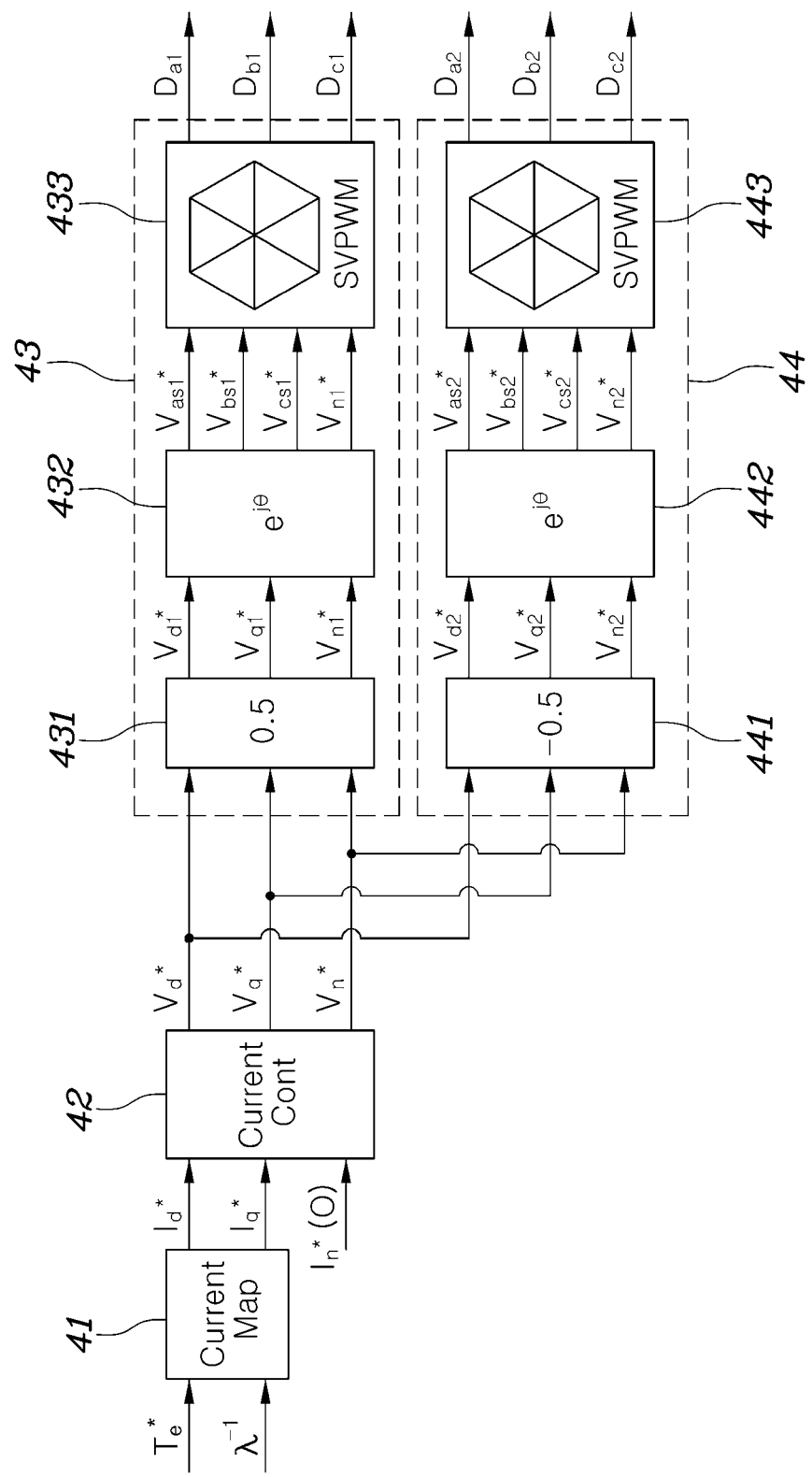
FIG. 2 is a block diagram showing a conventional controller configured for controlling a motor through an open end winding method in detail.
Figure 3:
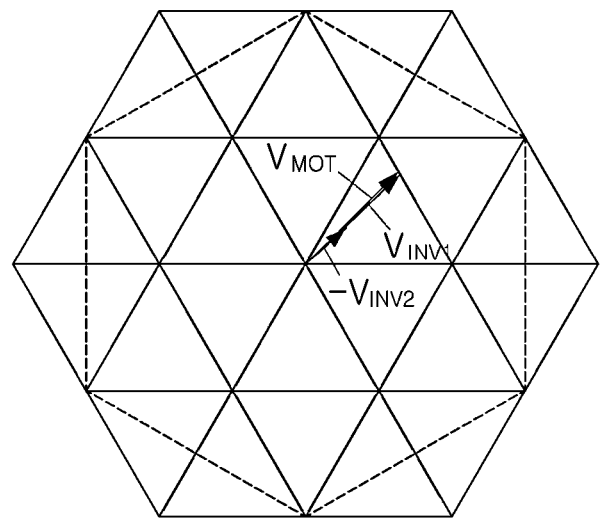
FIG. 3 is a voltage vector diagram for describing a motor control technique applied in the conventional controller shown in FIG. 2.
Figure 3:
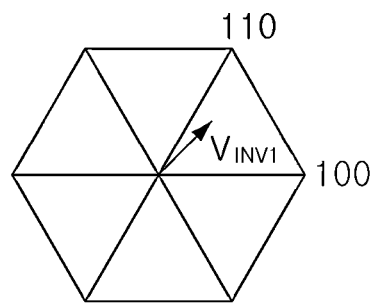
Figure 3:
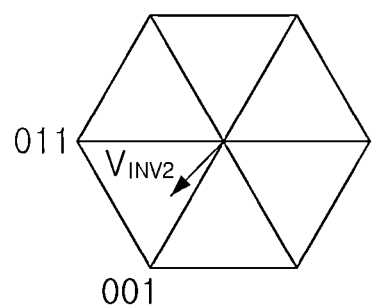
Figure 4:
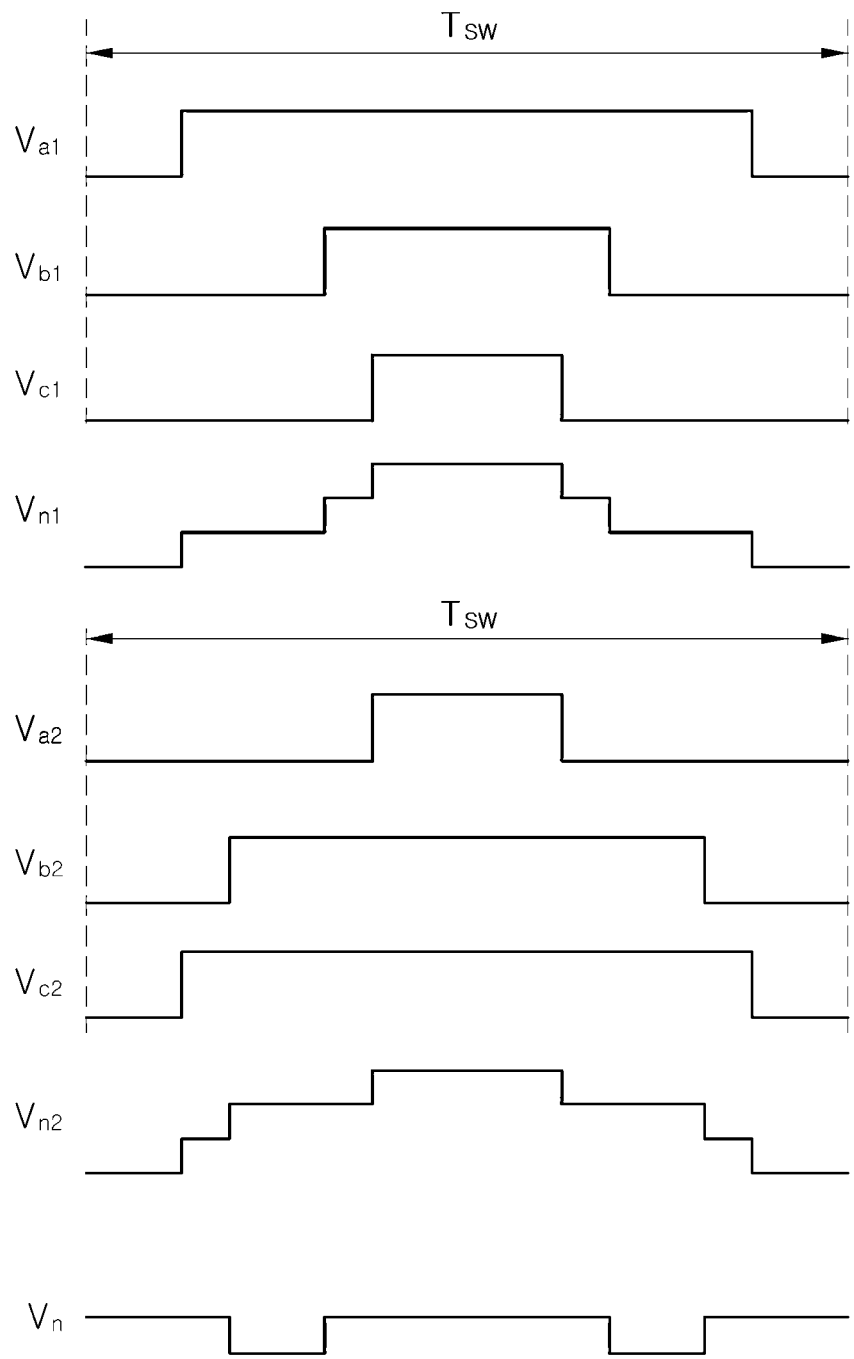
FIG. 4 is a waveform diagram showing voltage output of each inverter generated when the motor is controlled by the conventional controller shown in FIG. 2.
Figure 5:
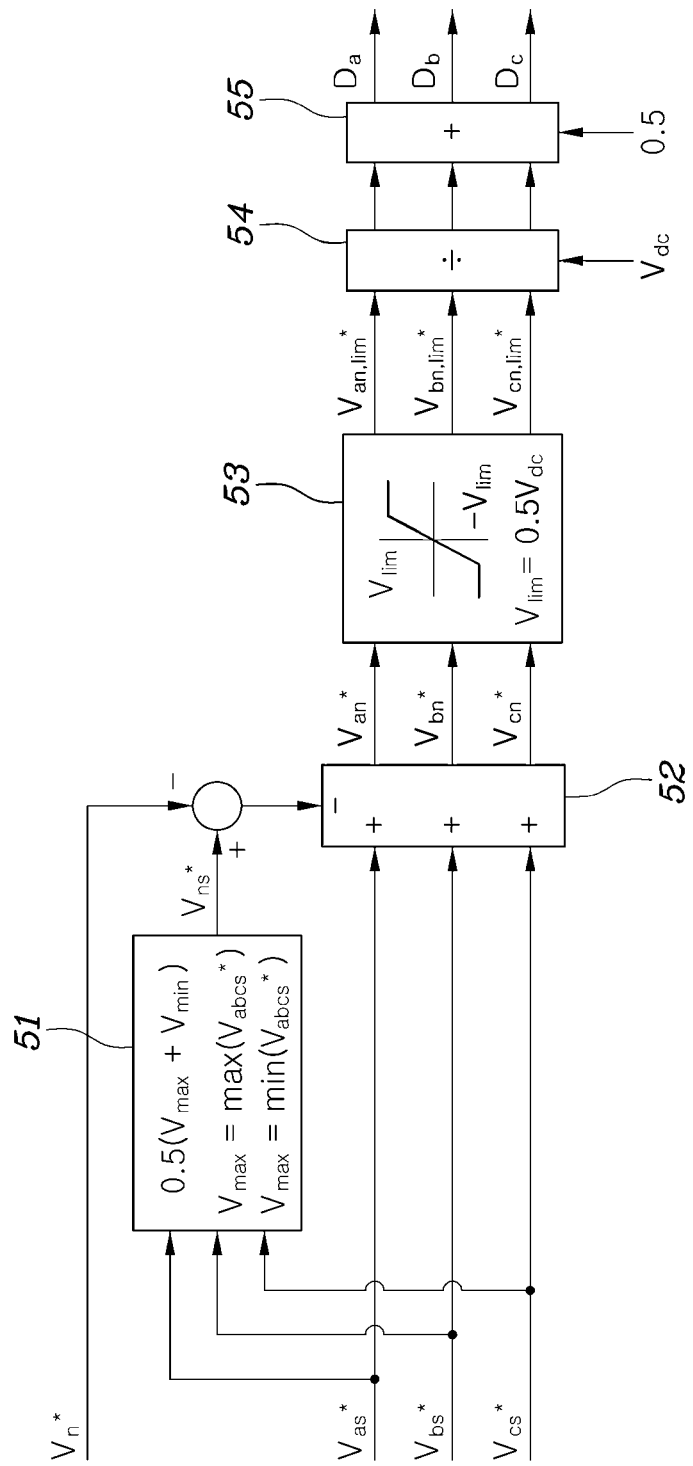
FIG. 5 is a block diagram showing a space vector modulation unit in the conventional controller shown in FIG. 2 in more detail.

FIG. 2 is a block diagram showing a conventional controller configured for controlling a motor through an open end winding method in detail and FIG. 3 is a voltage vector diagram for describing a motor control technique applied in the conventional controller shown in FIG. 2. FIG. 4 is a waveform diagram showing voltage output of each inverter generated when the motor is controlled by the conventional controller shown in FIG. 2 and FIG. 5 is a block diagram showing a space vector modulation unit in the conventional controller shown in FIG. 2 in more detail.

As shown in FIG. 2, the conventional controller of the motor driving apparatus may include a current command map 41, a current controller 42, a first duty generator 43, and a second duty generator 44.

The current command map 41 may generate current commands $I_d^*$ and $I_q^*$ based on required power of the motor (a motor required torque $T_e^*$) and the back electromotive force $\lambda^{-1}$ of the motor generated by operation of a driver, or the like. The current command map 41 generates current commands of the motor reflecting the required power of the motor, and a map based on the required power of the motor and back electromotive force is shown in the example of FIG. 2, but a map generating current commands based on other factors may be applied.

The current controller 42 may receive the current commands $I_d^*$ and $I_q^*$, compare the current commands with a value obtained by detecting a current actually provided to the motor, and generate voltage commands $V_d^*$, $V_q^*$, and $V_n^*$ that can reduce differences between the current commands and the current value. The voltage commands may include a d-axis component $V_d^*$, a q-axis component $V_q^*$, and a zero-phase component $V_n^*$.

The first duty generator 43 is an element for generating duties of the switching elements in the first inverter 10 shown in FIG. 1 and may include a multiplication unit 431 that multiplies the voltage commands $V_d^*$, $V_q^*$, and $V_n^*$ by ½ to generate first inverter voltage commands $V_{d1}^*$, $V_{q1}^*$, $V_{n1}^*$ to be applied to the first inverter 10, a coordinate transformation unit 432 that transforms the first inverter voltage commands $V_{d1}^*$, $V_{q1}^*$, and $V_{n1}^*$ into first inverter phase voltage commands $V_{as1}^*$, $V_{bs1}^*$, and $V_{cs1}^*$ corresponding to the respective phases of the motor, and a first space vector pulse width modulation unit 433 that performs space vector pulse width modulation based on the first inverter phase voltage commands $V_{as1}^*$, $V_{bs1}^*$, and $V_{cs1}^*$ and the zero-phase component $V_{n1}^*$ of the first inverter voltage commands to generate the duties of the switching elements in the first inverter 10.

Similarly to the first duty generator 43, the second duty generator 44 is an element for generating duties of the switching elements in the second inverter 10 shown in FIG. 1 and may include a multiplication unit 441 that multiplies the voltage commands $V_d^*$, $V_q^*$, and $V_n^*$ by −½ to generate second inverter voltage commands $V_{d2}^*$, $V_{q2}^*$, $V_{n2}^*$ to be applied to the second inverter 10, a coordinate transformation unit 442 that transforms the second inverter voltage commands $V_{d2}^*$, $V_{q2}^*$, and $V_{n2}^*$ into second inverter phase voltage commands $V_{as2}^*$, $V_{bs2}^*$, and $V_{cs2}^*$ corresponding to the respective phases of the motor, and a second space vector pulse width modulation unit 443 that performs space vector pulse width modulation based on the second inverter phase voltage commands $V_{as2}^*$, $V_{bs2}^*$, and $V_{cs2}^*$ and the zero-phase component $V_{n2}^*$ of the second inverter voltage commands to generate the duties of the switching elements in the second inverter 20.

Here, coordinate transformation performed by the coordinate transformation units 432 and 442 transforms dq synchronous coordinates into abc coordinates corresponding to three phases of the motor and pertains to the technology known as inverse Clarke/Park transformation in the art. Clarke/Park transformation which is reverse thereto is also known in the art and additional detailed description thereof will be omitted.

As shown in FIG. 2, the conventional open end winding type motor control technique is performed so that voltage commands of the motor are equally distributed to the first inverter and the second inverter.

That is, as shown in FIG. 3, in the control of the open end winding type motor, a motor voltage $V_{MOT}$ shown on a vector diagram corresponding to a combination of a switching vector diagram for the first inverter and a switching vector diagram for the second inverter may be represented in a form of a difference between a voltage $V_{INV1}$ according to the first inverter and a voltage $V_{INV2}$ according to the second inverter, which has the same magnitude as and a direction opposite to the voltage $V_{INV1}$ according to the first inverter. Each vector diagram is shown on the dq plane, and the dq plane and the vector diagram for space vector pulse width modulation are well-known in the art and thus additional detailed description thereof will be omitted.

In the present manner, when the first inverter voltage and the second inverter voltage having the same magnitude and opposite directions are generated through space vector pulse width modulation, an inverter output voltage waveform as shown in FIG. 4 may be obtained. In FIG. 4, $T_{SW}$ is a switching period of a switching element in an inverter, $V_{a1}$, $V_{b1}$, $V_{c1}$, and $V_{n1}$ represent phase voltages and a zero-phase component voltage of the first inverter, $V_{a2}$, $V_{b2}$, $V_{c2}$, and $V_{n2}$ represent phase voltages and a zero-phase component voltage of the second inverter, and $V_n$ represents a difference between the zero-phase component voltage of the first inverter and the zero-phase component voltage of the second inverter, which is a zero-phase component voltage applied to the motor by the first inverter and the second inverter.

As shown in FIG. 4, the first inverter voltage and the second inverter voltage have different zero-phase voltages because they have different phases although they have the same voltage magnitude on the dq plane. Therefore, the magnitude of the zero-phase component voltage $V_n$ applied to the motor cannot be maintained at zero on average in periods.

The space vector modulation unit 433 or 443 in the conventional controller shown in FIG. 2 may include an offset voltage generator 51, a pole voltage command generator 52, a pole voltage command limiter 53, a divider 54, and an adder 55 as shown in FIG. 5.

The offset voltage generator 51 generates an offset voltage command $V_{ns}*$ based on three-phase voltage commands $V_{as}+$, $V_{bs}*$, and $V_{cs}*$, and the pole voltage command generator 52 generates pole voltage commands $V_{an}*$, $V_{bn}*$, and $V_{cn}*$ by subtracting a value obtained by subtracting the zero-phase component voltage $V_n*$ from the offset voltage command $V_{ns}*$ from the three-phase voltage commands $V_{as}+$, $V_{bs}*$, and $V_{cs}*$.

In the present manner, the offset voltage command $V_{ns}*$ is generated based on the three-phase voltage commands $V_{as}+$, $V_{bs}*$, and $V_{cs}*$ when the conventional open end winding type motor is controlled and thus has a difference from the offset voltage output from each inverter when the motor is actually driven with the two inverters, because the first inverter and the second inverter generate different offset voltage commands $V_{ns}*$, an offset voltage corresponding to the offset voltage command is not actually output from each inverter.

This is represented as Equation 1 below.

$$V_{ns1}=V_{n1}*-V_{ns1}*=0.5V_n*-V_{ns1}*$$

$$V_{ns2}=V_{n2}*-V_{ns2}*=-0.5V_n*-V_{ns2}* \quad [\text{Equation 1}]$$

Accordingly, a zero-phase component voltage finally applied to the motor becomes a voltage represented by Equation 2 below, and thus it is impossible to control the zero-phase component voltage as desired.

$$V_{ns1}-V_{ns2}=V_n*-V_{ns1}*+V_{ns2}* \quad [\text{Equation 2}]$$

In the present manner, when the zero-phase component voltage is not controlled to zero on average in periods, a common mode current of the motor is generated, a loss occurring in the motor increases due to flow of the common mode current, and in severe cases, the motor may be damaged.

In FIG. 5, the pole voltage command limiter 53 may limit the pole voltage commands to a range of ±0.5 of a DC voltage $V_{DC}$ applied to the first inverter and the second inverter, the divider 54 may divide the limited pole voltage commands by the DC voltage $V_{DC}$ applied to the first inverter and the second inverter, and the adder 55 may add 0.5 to the results of the divider 54 to determine duties $D_a$, $D_b$, and $D_c$ of the switching elements in the inverters.

The pole voltage command limiter 53, the divider 54, and the adder 55 correspond to known technology applied to implement pulse width modulation control and detailed operations may be sufficiently implemented by those skilled in the art, and thus additional detailed description thereof will be omitted.

Figure 6:
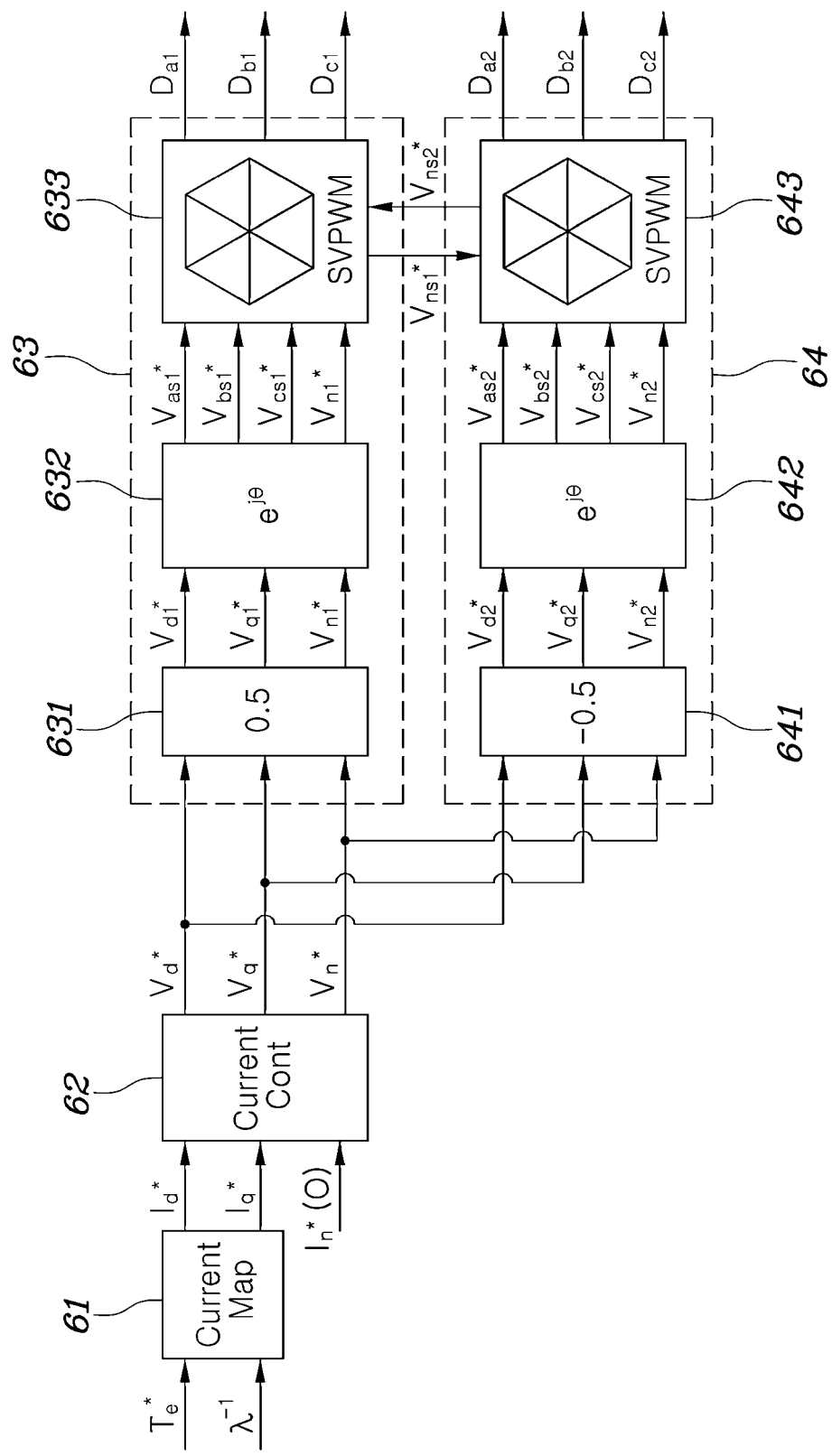
FIG. 6 is a block diagram showing a controller applied to a motor driving apparatus according to various exemplary embodiments of the present disclosure in detail.

FIG. 6 is a block diagram showing a controller applied to a motor driving apparatus according to various exemplary embodiments of the present disclosure in detail.

Referring to FIG. 6, the controller 30 applied to the motor driving apparatus according to the exemplary embodiment of the present disclosure may include a current command map 61, a current controller 62, a first duty generator 63, and a second duty generator 64.

The current command map 61 may generate current commands $I_d*$ and $I_q*$ based on required power of the motor (a motor required torque $T_e*$) and the back electromotive force λ1 of the motor generated by operation of a driver, or the like.

The current controller 62 may receive the current commands $I_d*$ and $I_q*$, compare the current commands with a value obtained by detecting a current actually provided to the motor, and generate voltage commands $V_d*$, $V_q*$, and $V_n*$ that can reduce differences between the current commands and the current value. The voltage commands may include a d-axis component $V_d*$, a q-axis component $V_q*$, and a zero-phase component $V_n*$.

The current command map 61 and the current controller 62 may be substantially the same as those applied to the conventional motor control technique shown in FIG. 2.

The first duty generator 63 is an element for generating duties of the switching elements in the first inverter 10 and may include a multiplication unit 631 that multiplies the voltage commands $V_d*$, $V_q*$, and $V_n*$ by ½ to generate first inverter voltage commands $V_{d1}*$, $V_{q1}*$, $V_{n1}*$ to be applied to the first inverter 10, a coordinate transformation unit 632 that transforms the first inverter voltage commands $V_{d1}*$, $V_{q1}*$, and $V_{n1}*$ into first inverter phase voltage commands $V_{as1}*$, $V_{bs1}*$, and $V_{cs1}*$ corresponding to the respective phases of the motor, and a first space vector pulse width modulation unit 633 that performs space vector pulse width modulation based on a first offset voltage command $V_{ns1}*$ generated based on the first inverter phase voltage commands $V_{as1}*$, $V_{bs1}*$, and $V_{cs1}*$, the zero-phase component $V_{n1}*$ of the first inverter voltage command, and a second offset voltage command $V_{ns2}*$ generated by the second duty generator 64 to generate duties $D_{a1}$, $D_{b1}$, and $D_{c1}$ of the switching elements in the first inverter 10.

Similarly to the first duty generator 63, the second duty generator 64 is an element for generating duties of the switching elements in the second inverter 20 and may include a multiplication unit 641 that multiplies the voltage commands $V_d*$, $V_q*$, and $V_n*$ by −½ to generate second inverter voltage commands $V_{d2}*$, $V_{q2}*$, $V_{n2}*$ to be applied to the second inverter 20, a coordinate transformation unit 642 that transforms the second inverter voltage commands $V_{d2}*$, $V_{q2}*$, and $V_{n2}*$ into second inverter phase voltage commands $V_{as2}*$, $V_{bs2}*$, and $V_{cs2}*$ corresponding to each phase of the motor, and a second space vector pulse width modulation unit 643 that performs space vector pulse width modulation based on the second offset voltage command $V_{ns2}*$ generated based on the second inverter phase voltage commands $V_{as2}*$, $V_{bs2}*$, and $V_{cs2}*$, the zero-phase component $V_{n2}*$ of the second inverter voltage command, and the first offset voltage command $V_{ns1}*$ generated by the first duty generator 63 to generate duties $D_{a2}$, $D_{b2}$, and $D_{c2}$ of the switching elements in the second inverter 20.

In various exemplary embodiments of the present disclosure, the first duty generator 63 and the second duty generator 64 share offset voltage commands determined by the output voltages of the first inverter 10 and the second inverter 20 so that the two inverters have the same zero-phase component voltage by sharing the voltage commands with each other. That is, the first duty generator 63 for controlling the first inverter 10 may generate the first offset voltage command $V_{ns1}*$ using the first inverter phase voltage commands $V_{as1}*$, $V_{bs1}*$, and $V_{cs1}*$ corresponding to the output voltage of the first inverter 10 and provide the same to the second duty generator 64, and the second duty generator 64 for controlling the second inverter 20 may generate the second offset voltage command $V_{ns2}*$ using the second inverter phase voltages command $V_{as2}*$, $V_{bs2}*$, and $V_{cs2}*$ corresponding to the output voltage of the second inverter 20 and provide the same to the first duty generator 63.

The first duty generator 63 and the second duty generator 64 may synthesize the first offset voltage command $V_{ns1}*$ and the second offset voltage command $V_{ns2}*$ to generate synthesized offset voltage commands having the same value and apply the synthesized offset voltage commands and the zero-phase component voltage commands $V_{n1}^*$ and $V_{n2}^*$ of the inverters to the phase voltage commands of the inverters to generate pole voltage commands for the inverters.

Figure 7:
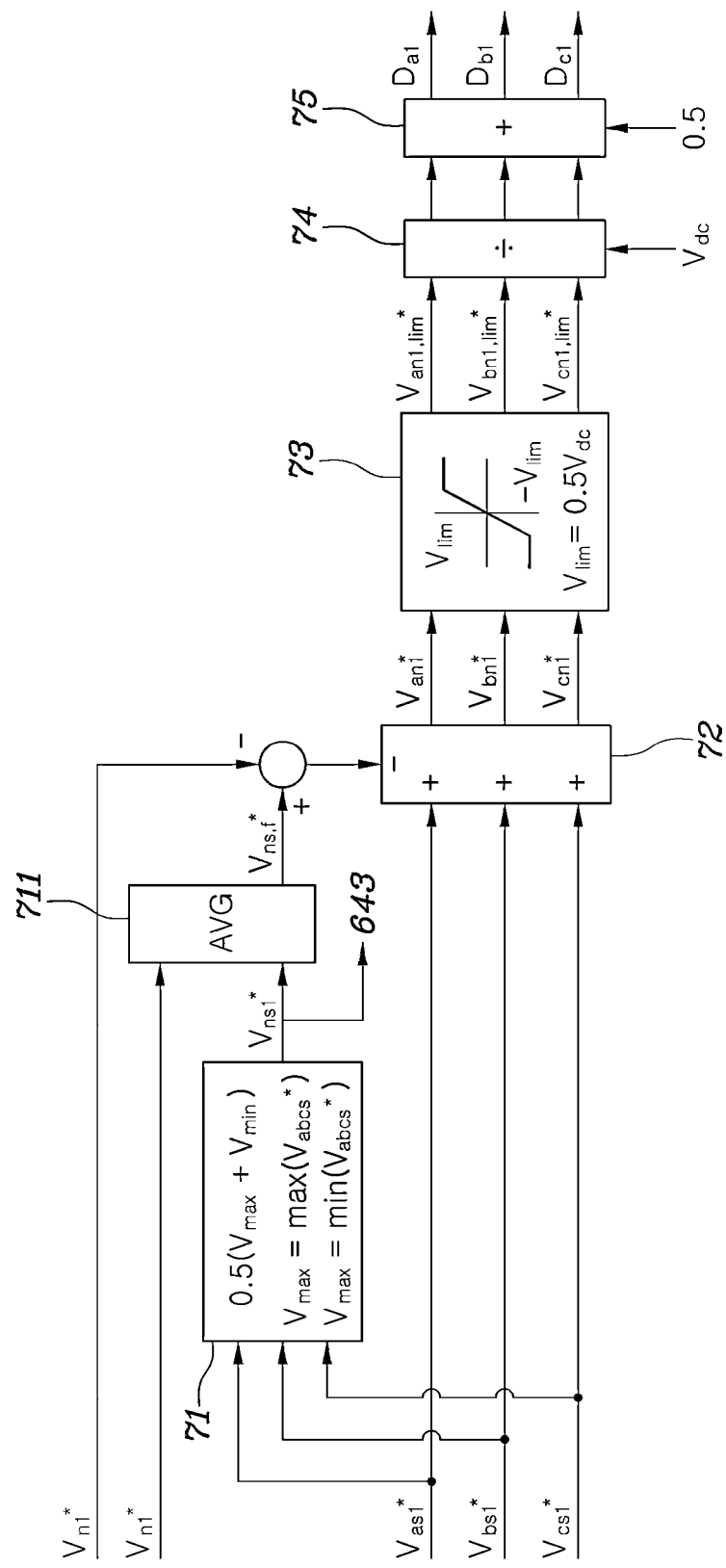
FIG. 7 is a block diagram showing a space vector modulation unit in the controller applied to the motor driving apparatus according to various exemplary embodiments of the present disclosure shown in FIG. 6 in more detail.

FIG. 7 is a block diagram showing a space vector modulation unit in the controller applied to the motor driving apparatus according to various exemplary embodiments of the present disclosure in more detail. FIG. 7 shows the first space vector pulse width modulation unit 643 in the first duty generator 63 in detail, and the second space vector pulse width modulation unit 644 in the second duty generator 64 may also be implemented to have a corresponding configuration although not shown.

Referring to FIG. 7, the first space vector pulse width modulation unit 634 in the first duty generator 63 may include an offset voltage generator 71, an offset voltage command synthesizer 711, a pole voltage command generator 72, a pole voltage command limiter 73, a divider 74, and an adder 75.

The offset voltage generator 71 may generate the offset voltage command $V_{ns1}^*$ based on the three-phase voltage commands $V_{as1}^*$, $V_{bs1}^*$, of $V_{cs1}^*$ of the first inverter.

Although the offset voltage generator 71 determines an average of the maximum value and the minimum value of the three-phase voltage commands $V_{as1}^*$, $V_{bs1}^*$, of $V_{cs1}^*$ as the offset voltage command $V_{ns1}^*$ of the first inverter 10 in the example shown in FIG. 7, this is exemplary and the offset voltage command may be determined in various ways known in the art.

The offset voltage command synthesizer 711 may synthesize the offset voltage command $V_{ns1}^*$ of the first inverter 10 generated by the offset voltage generator 71 and the offset voltage command $V_{ns2}^*$ of the second inverter 20 generated by the second space vector pulse width modulation unit 644 in the second duty generator 64 to generate a synthesized offset voltage command $V_{ns,f}^*$.

The offset voltage command synthesizer 711 may generate the synthesized offset voltage command $V_{ns,f}^*$ in various manners. For example, the offset voltage command synthesizer 711 may apply a weight to the offset voltage command $V_{ns1}^*$ of the first inverter 10 and the offset voltage command $V_{ns2}^*$ of the second inverter 20 and sum the same to generate the synthesized offset voltage command $V_{ns,f}^{}$. Furthermore, the offset voltage command synthesizer 711** may determine the offset voltage command $V_{ns2}^*$ as an average of the offset voltage command $V_{ns1}^*$ of the first inverter 10 and the offset voltage command $V_{ns2}^*$ of the second inverter 20.

No matter how the offset voltage command synthesizer 711 generates the synthesized offset voltage command $V_{ns,f}^*$, the synthesized offset voltage commands $V_{ns,f}^{}$ respectively generated by the first space vector pulse width modulation unit 634 and the second space vector pulse width modulation unit 644** need to have the same value.

When the average of the offset voltage command $V_{ns1}^*$ of the first inverter 10 and the offset voltage command $V_{ns2}^*$ of the second inverter 20 is determined as the synthesized offset voltage command by the offset voltage command synthesizer 711, the zero-phase component voltages output from the inverters are represented by Equation 3 below.

$$V_{ns1} = V_{n1}^* - V_{ns,f}^* = 0.5V_n^* - 0.5^*(V_{ns1}^* + V_{ns2}^*)$$

$$V_{ns2} = V_{n2}^* - V_{ns,f}^* = -0.5V_n^* - 0.5^*(V_{ns1}^* + V_{ns2}^*) \quad \text{[Equation 3]}$$

According to Equation 3, a difference $V_{ns1} - V_{ns2}$ between the zero-phase component voltages of the two inverters may be output as the zero-phase component voltage command $V_n^*$ set by the current controller 62. Here, when the synthesized offset voltage command $V_{ns,f}^*$ finally applied to modulation of the two inverters is determined as the average of the two offset voltage commands $V_{ns1}^*$ and $V_{ns2}^*$, the two inverters have the same output duty margin. Accordingly, the synthesized offset voltage command $V_{ns,f}^{**}$ is determined as the average of the two offset voltage commands $V_{ns1}^*$ and $V_{ns2}^*$.

In FIG. 7, the pole voltage command generator 72 may generate pole voltage commands $V_{an1}^*$, $V_{bn1}^*$, and $V_{cn1}^*$ by subtracting a value obtained by subtracting the zero-phase component voltage $V_{n1}^*$ of the voltage commands of the first inverter 10 from the synthesized offset voltage command $V_{ns,f}^*$ from the three-phase voltage commands $V_{as1}^*$, $V_{bs1}^*$, and $V_{cs1}^*$.

In FIG. 7, the pole voltage command limiter 73 may limit the pole voltage commands to a range of ±0.5 of a DC voltage $V_{DC}$ applied to the first inverter and the second inverter, the divider 74 may divide the limited pole voltage commands by the DC voltage $V_{DC}$ applied to the first inverter and the second inverter, and the adder 55 may add 0.5 to the results of the divider 54 to determine duties $D_a$, $D_b$, and $D_c$ in the switching elements in the inverters.

The pole voltage command limiter 73, the divider 74, and the adder 75 correspond to known technology applied to implement pulse width modulation control and detailed operations may be sufficiently implemented by those skilled in the art, and thus additional detailed description thereof will be omitted.

Although FIG. 7 shows a detailed configuration of the space vector pulse width modulation unit 633 in the first duty generator 63, those skilled in the art can easily infer the detailed configuration of the space vector pulse width modulation unit 643 in the second duty generator 64 through FIG. 7. Accordingly, additional description of the space vector pulse width modulation unit 643 in the second duty generator 64 will be omitted.

Figure 8:
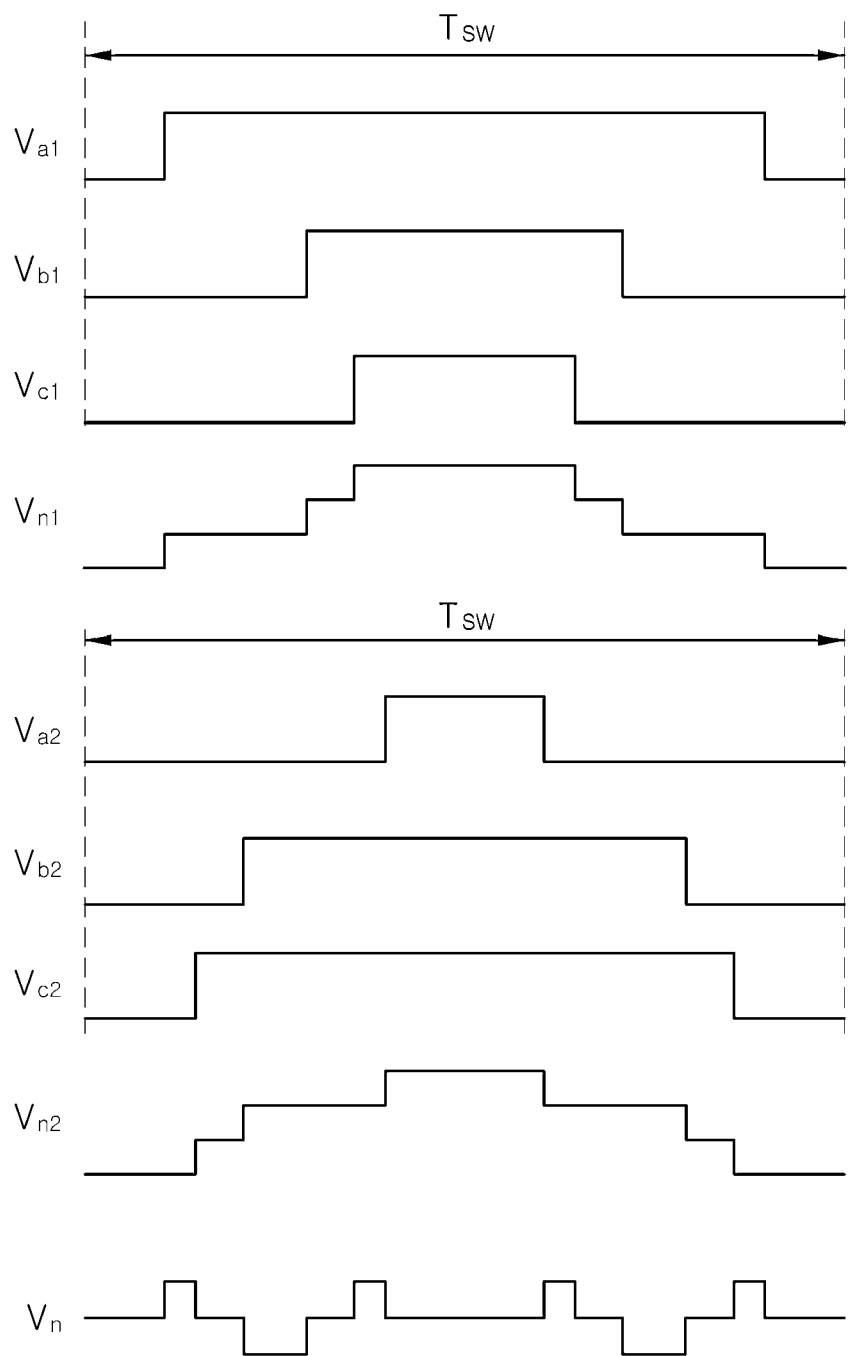
FIG. 8 is a waveform diagram showing voltage output of each inverter generated according to control of the motor driving apparatus according to various exemplary embodiments of the present disclosure shown in FIG. 6.

FIG. 8 is a waveform diagram showing voltage output of each inverter generated according to control of the motor driving apparatus according to various exemplary embodiments of the present disclosure.

Referring to FIG. 8, when compared to waveforms of the conventional motor driving apparatus shown in FIG. 4, the zero-phase component voltage $V_n$ of the motor is determined so that it has an average of 0 within one period according to the motor driving apparatus according to various exemplary embodiments of the present disclosure.

Therefore, in the motor driving apparatus according to various exemplary embodiments of the present disclosure, desired control may be performed so that distortion of the zero-phase component voltage does not occur according to the space vector pulse width modulation, and thus it is possible to curb a common mode current generated in the motor, prevent unnecessary loss of the motor, and prevent motor damage.

The above-described embodiment of the present disclosure illustrated in FIG. 6, FIG. 7 and FIG. 8 is an exemplary embodiment in which the average of zero-phase component voltages in a switching period is controlled to be zero. In the exemplary embodiment of the present disclosure of the present disclosure, the zero-phase component voltages may be controlled to be zero on average in periods, but a common mode current may be generated because the zero-phase component voltages instantaneously pulsate and the instantaneous common mode current can also cause a loss of the motor. Hereinafter, another exemplary embodiment of the present disclosure in which even an instantaneous common mode current may be eliminated by curbing pulsation of the zero-phase component voltages will be described.

Figure 9:
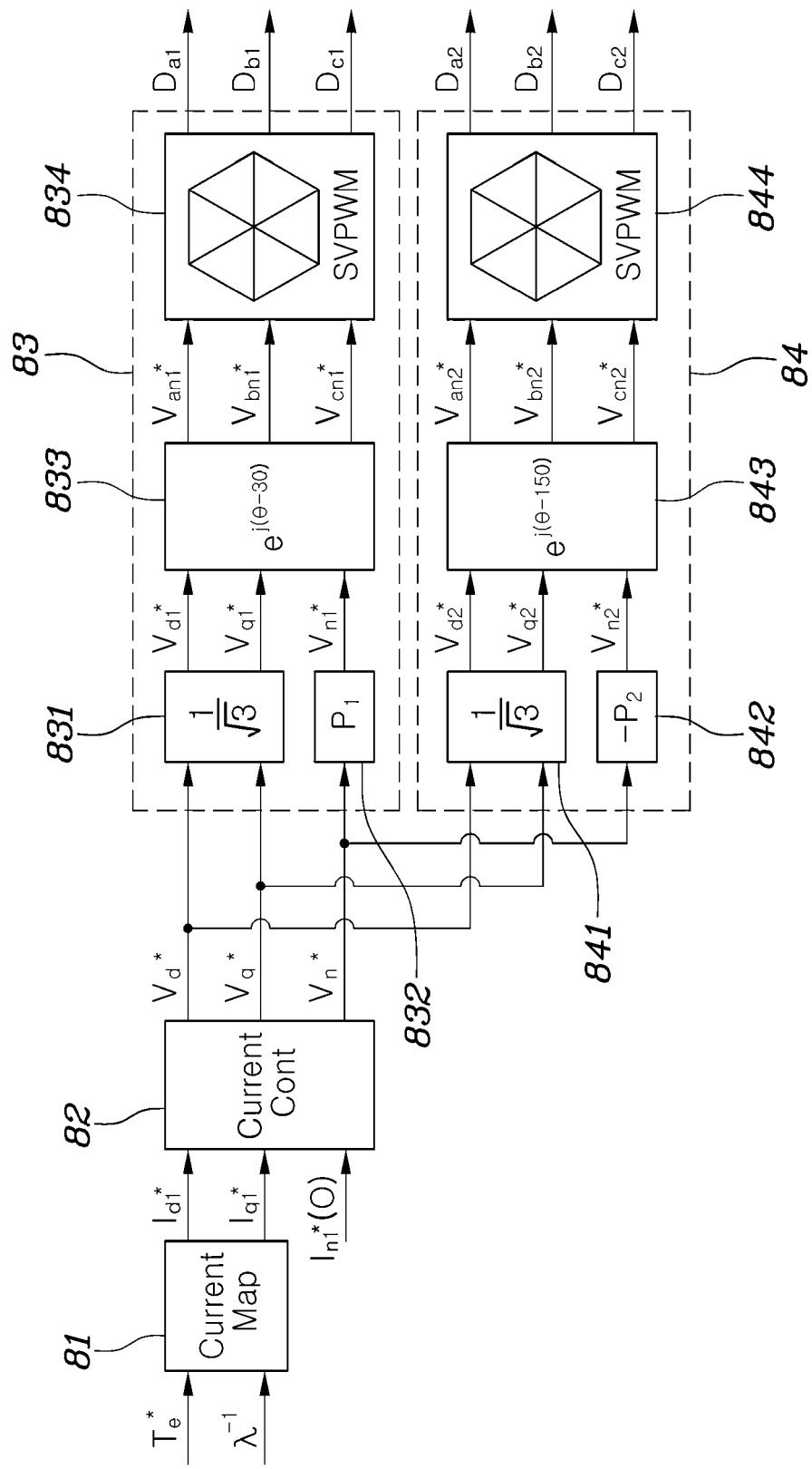
FIG. 9 is a block diagram showing a controller applied to a motor driving apparatus according to various exemplary embodiments of the present disclosure in detail.

FIG. 9 is a block diagram showing a controller applied to a motor driving apparatus according to various exemplary embodiments of the present disclosure in detail.

Referring to FIG. 9, the controller 30 of the motor driving apparatus according to various exemplary embodiments of the present disclosure may include a current command map 81, a current controller 82, a first duty generator 83, and a second duty generator 84.

The current command map 81 may generate current commands $I_d^*$ and $I_q^*$ based on required power of the motor (a motor required torque $T_e^*$) and the back electromotive force $\lambda^{-1}$ of the motor generated by operation of a driver, or the like.

The current controller 82 may receive the current commands $I_d^*$ and $I_q^*$, compare the current commands with a value obtained by detecting a current actually provided to the motor, and generate voltage commands $V_d^*$, $V_q^*$, and $V_n^*$ that can reduce differences between the current commands and the current value. The voltage commands may include a d-axis component $V_d^*$, a q-axis component $V_q^*$, and a zero-phase component $V_n^*$.

The current command map 81 and the current controller 82 may be substantially the same as those applied to the conventional motor control technique shown in FIG. 2.

The first duty generator 83 is an element for generating duties of the switching elements in the first inverter 10 and may include a first multiplication unit 831 that multiplies the d-axis voltage command $V_d^*$ and the q-axis voltage command $V_q^*$ among the voltage commands $V_d^*$, $V_q^*$, and $V_n^*$ by $1/\sqrt{3}$ to generate a first inverter d-axis voltage command $V_{d1}^*$ and a first inverter q-axis voltage command $V_{q1}^*$ to be applied to the first inverter 10, a second multiplication unit 832 that multiplies the zero-phase component voltage command among the voltage commands $V_d^*$, $V_q^*$, and $V_n^*$ by $P_1$ to generate a first inverter zero-phase component voltage command $V_{n1}^*$, a coordinate transformation unit 833 that transforms the first inverter voltage commands $V_{d1}^*$, $V_{q1}^*$, and $V_{n1}^*$ into first inverter phase voltage commands $V_{as1}^*$, $V_{bs1}^*$, and $V_{cs1}^*$ corresponding to the respective phases of the motor so that they precede or lag behind the rotation angle θ of the motor by 30 degrees, and a first space vector pulse width modulation unit 834 that performs space vector pulse width modulation based on the first inverter phase voltage commands $V_{as1}^*$, $V_{bs1}^*$, and $V_{cs1}^*$ to generate duties $D_{a1}$, $D_{b1}$, and $D_{c1}$ of the switching elements in the first inverter 10.

The second duty generator 84 is an element for generating duties of the switching elements in the second inverter 20 and may include a third multiplication unit 841 that multiplies the d-axis voltage command $V_d^*$ and the q-axis voltage command $V_q^*$ among the voltage commands $V_d^*$, $V_q^*$, and $V_n^*$ by $1/\sqrt{3}$ to generate a second inverter d-axis voltage command $V_{d2}^*$ and a second inverter q-axis voltage command $V_{q2}^*$ to be applied to the second inverter 20, a fourth multiplication unit 842 that multiplies the zero-phase component voltage command among the voltage commands $V_d^*$, $V_q^*$, and $V_n^*$ by $-P_2$ (here, $P_1+P_2=1$) to generate a second inverter zero-phase component voltage command $V_{n2}^*$, a coordinate transformation unit 843 that transforms the second inverter voltage commands $V_{d2}^*$, $V_{q2}^*$, and $V_{n2}^*$ into second inverter phase voltage commands $V_{as2}^*$, $V_{bs2}^*$, and $V_{cs2}^*$ corresponding to the respective phases of the motor so that they precede or lag behind the rotation angle θ of the motor by 150 degrees, and a second space vector pulse width modulation unit 844 that performs space vector pulse width modulation based on the second inverter phase voltage commands $V_{as2}^*$, $V_{bs2}^*$, and $V_{cs2}^*$ to generate duties $D_{a2}$, $D_{b2}$, and $D_{c2}$ of the switching elements in the second inverter 20.

Here, it is known in the art that the rotation angle θ of the motor may be obtained from a rotation angle detector provided in the motor.

In various exemplary embodiments of the present disclosure, the first duty generator 83 and the second duty generator 84 perform coordinate transformation so that the d-axis voltage command the q-axis voltage command have a difference of 120 degrees therebetween in a process of transformation thereof into three-phase voltage commands.

Figure 10:
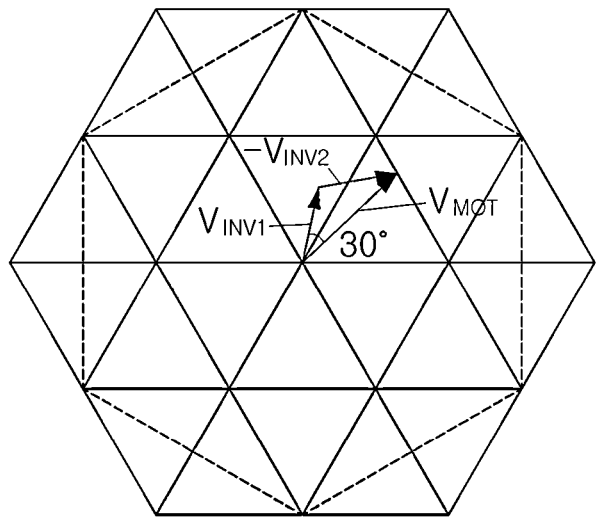
FIG. 10 is a voltage vector diagram for describing an example of transforming a phase voltage command of a first inverter so that it precedes the rotation angle of a motor by 30 degrees and transforming a phase voltage command of a second inverter so that it precedes the rotation angle of the motor by 150 degrees in the exemplary embodiment of the present disclosure shown in FIG. 9.
Figure 10:
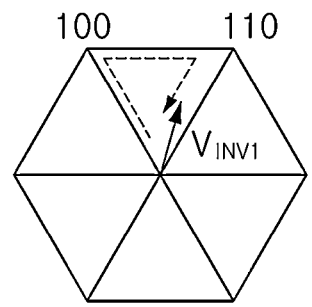
Figure 10:
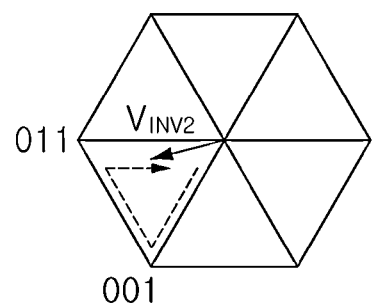
Figure 11:
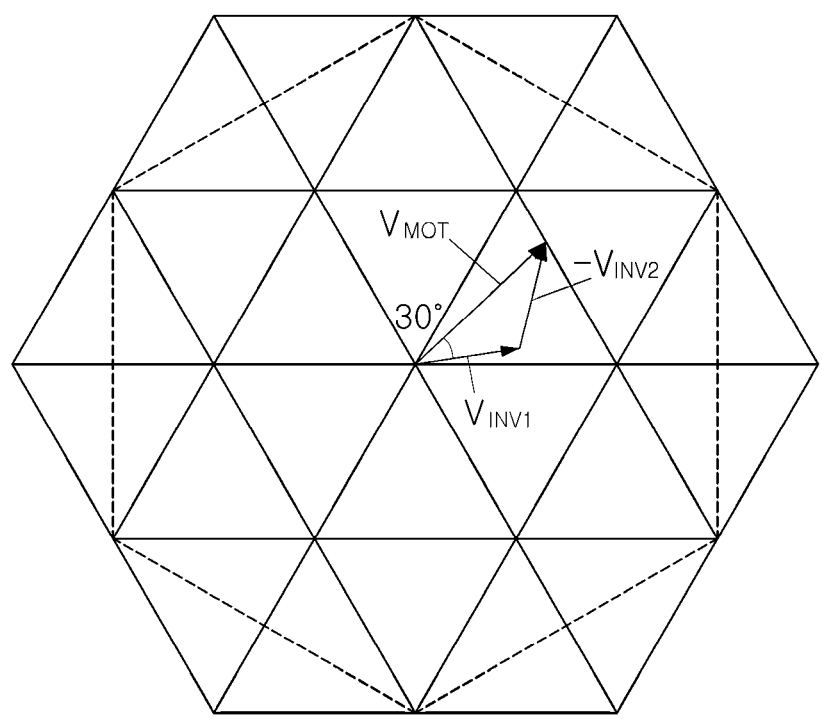
FIG. 11 is a voltage vector diagram for describing an example of transforming a phase voltage command of the first inverter so that it lags behind the rotation angle of the motor by 30 degrees in the exemplary embodiment of the present disclosure shown in FIG. 9 and transforming a phase voltage command of the second inverter so that it lags behind the rotation angle of the motor by 150 degrees in the exemplary embodiment of the present disclosure shown in FIG. 9.

FIG. 10 is a voltage vector diagram for describing an example of transforming a phase voltage command of the first inverter so that it precedes the rotation angle of the motor by 30 degrees and transforming a phase voltage command of the second inverter so that it precedes the rotation angle of the motor by 150 degrees in the exemplary embodiment of the present disclosure shown in FIG. 9, and FIG. 11 is a voltage vector diagram for describing an example of transforming a phase voltage command of the first inverter so that it lags behind the rotation angle of the motor by 30 degrees and transforming a phase voltage command of the second inverter so that it lags behind the rotation angle of the motor by 150 degrees in the exemplary embodiment of the present disclosure shown in FIG. 9.

As shown in FIG. 10, a motor voltage $V_{MOT}$ may be represented as a difference between a first inverter voltage $V_{INV1}$ and a second inverter voltage $V_{INV2}$. It may be ascertained that the difference between the first inverter voltage and the second inverter voltage represents the motor voltage when the first inverter voltage $V_{INV1}$ precedes the motor voltage $V_{MOT}$ by 30 degrees and has a magnitude of $1/\sqrt{3}$ times the motor voltage and the second inverter voltage $V_{INV2}$ precedes the motor voltage $V_{MOT}$ by 150 degrees and has a magnitude of $1/\sqrt{3}$ times the motor voltage.

Similarly, as shown in FIG. 11, it may be ascertained that the difference between the first inverter voltage and the second inverter voltage represents the motor voltage when the first inverter voltage $V_{INV1}$ lags behind the motor voltage $V_{MOT}$ by 30 degrees and has a magnitude of $1/\sqrt{3}$ times the motor voltage and the second inverter voltage $V_{INV2}$ lags behind the motor voltage $V_{MOT}$ by 150 degrees and has a magnitude of $1/\sqrt{3}$ times the motor voltage.

Figure 12:
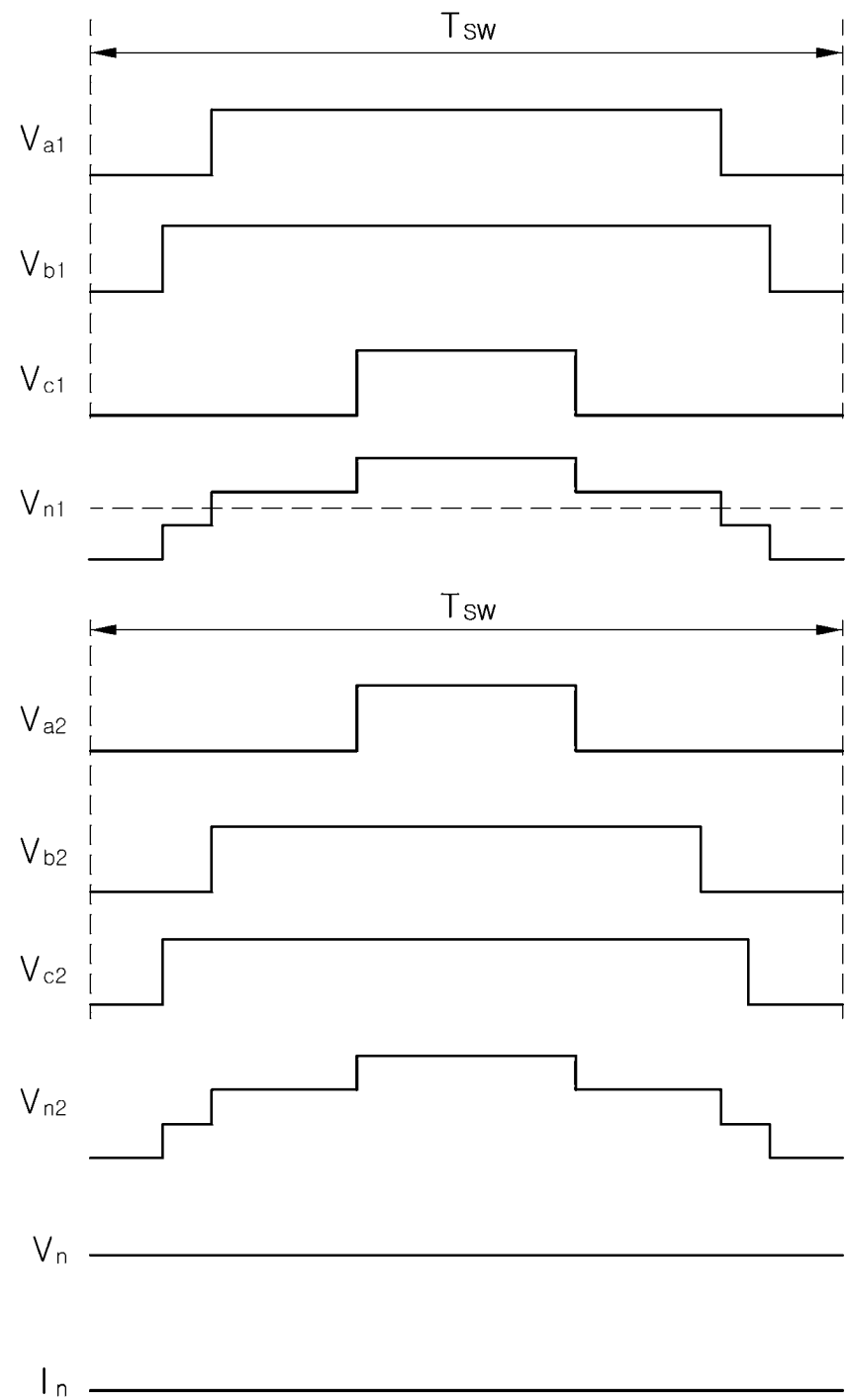
FIG. 12 is a waveform diagram showing a voltage output, a zero-phase voltage component, and a common mode current of each inverter generated according to control of the motor driving apparatus according to the exemplary embodiment of the present disclosure shown in FIG. 9.

FIG. 12 is a waveform diagram showing a voltage output, a zero-phase voltage component, and a common mode current of each inverter generated according to control of the motor driving apparatus according to the exemplary embodiment of the present disclosure shown in FIG. 9.

As shown in FIG. 12, it may be ascertained that, if voltage vectors output from the two inverters have a difference of 120 degrees, the same zero-phase component voltages $V_{n1}$ and $V_{n2}$ instantaneously appear when modulation using the two voltage vectors is performed. Accordingly, it may be ascertained that a difference $V_n$ between the zero-phase component voltages of the two inverters becomes zero instantaneously, and thus zero-phase component current ripples (common mode current) due to the difference between the zero-phase component voltages also become zero.

In various exemplary embodiments of the present disclosure, different zero-phase component voltage commands $V_n^*$ may be distributed to the inverters. That is, the multiple value $P_1$ for the first inverter and the multiple value $P_2$ for the second inverter, set by the second multiplication unit 832 and the fourth multiplication unit 842, may be determined to be different values. Here, the sum of the magnitudes of the two multiple values should be 1 ($P_1+P_2=1$).

Because distribution of the zero-phase voltage commands $V_n{}^*$ does not affect the motor output, the zero-phase voltage commands are the same for the motor.

For example, if the same zero-phase voltage is distributed (if $P_1$ and $P_2$ have the same magnitudes), the final output duties of the two inverters become different due to an error present in the inverters, such as a switching dead time, and compensation for the error and thus the duty of one inverter may be limited.

On the other hand, if the two inverters are provided a degree of freedom for distribution of the zero-phase voltage commands, a means for adjusting the maximum values of the duties which become different from each other due to an error present in the inverters, such as the dead time, to the same value can be provided, which can increase the motor output. That is, it is possible to appropriately solve problems caused by errors inevitably generated in the inverters by tuning the multiple values $P_1$ and $P_2$ to improve motor power.

As described above, in the exemplary embodiment of the present disclosure described with reference to FIG. 9 to FIG. 12, it is possible to equally generate the zero-phase output voltages of the two inverters according to space vector pulse width modulation (SVPWM) by setting the voltage vectors of the two inverters so that they have a phase difference of 120 degrees, to thereby eliminate zero-phase switching pulsation between the two inverters.

However, the exemplary embodiment of the present disclosure employs a method of separating the voltage for driving each inverter from all voltage commands Vagn* of the motor driving system and then performing determination for driving each inverter through space vector pulse width modulation. The present method requires lots of determinations for coordinate transformation, size limitation, and the like and may cause a problem that the output voltages of the inverters have errors due to discrete errors in cosine and sine determinations.

Accordingly, various aspects of the present disclosure are directed to providing another exemplary embodiment configured for solving switching pulsation caused by a zero-phase voltage through a simpler operation.

Figure 13:
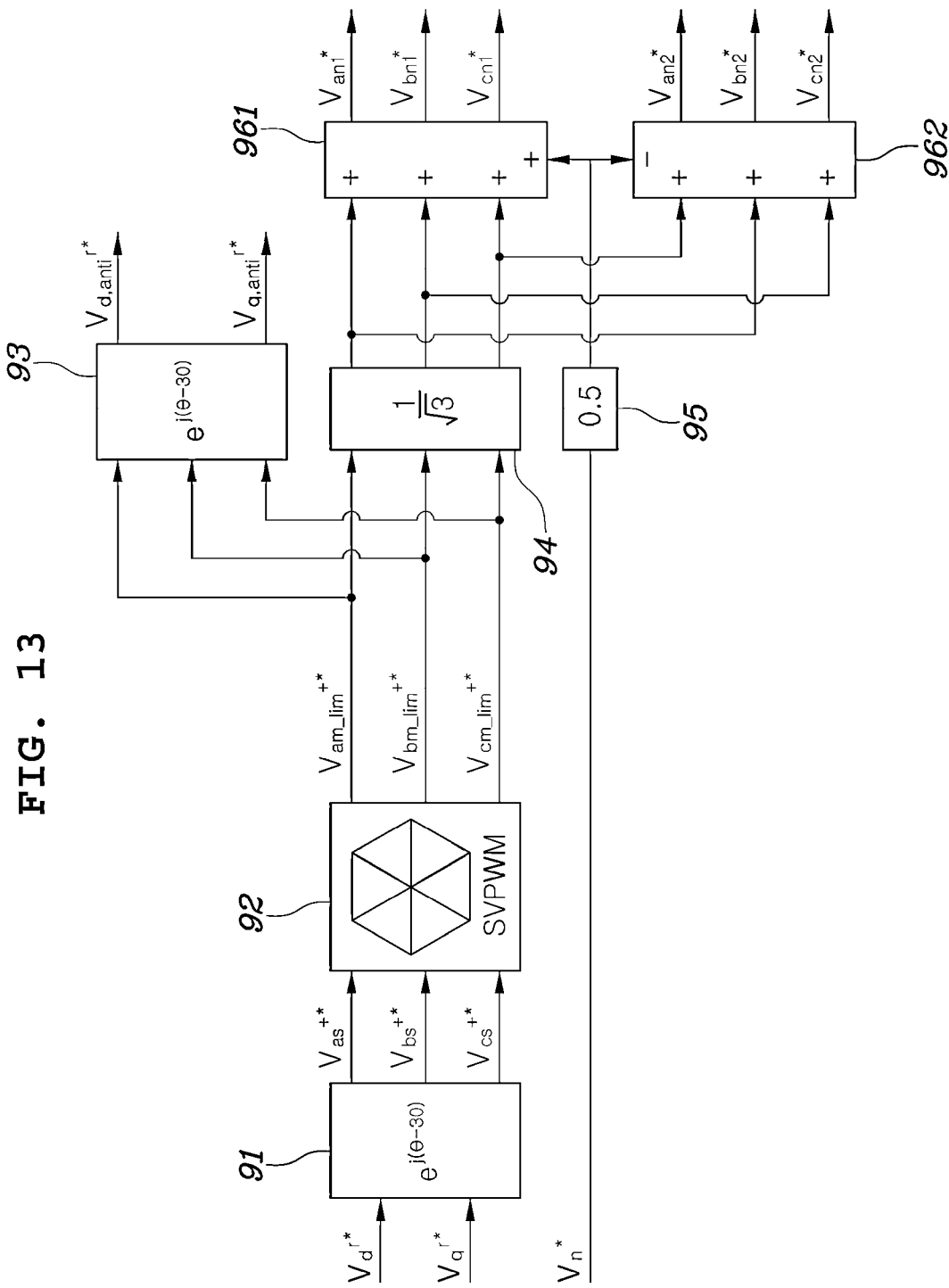
FIG. 13 is a block diagram showing a controller applied to a motor driving apparatus according to various exemplary embodiments of the present disclosure in detail.
Figure 14:
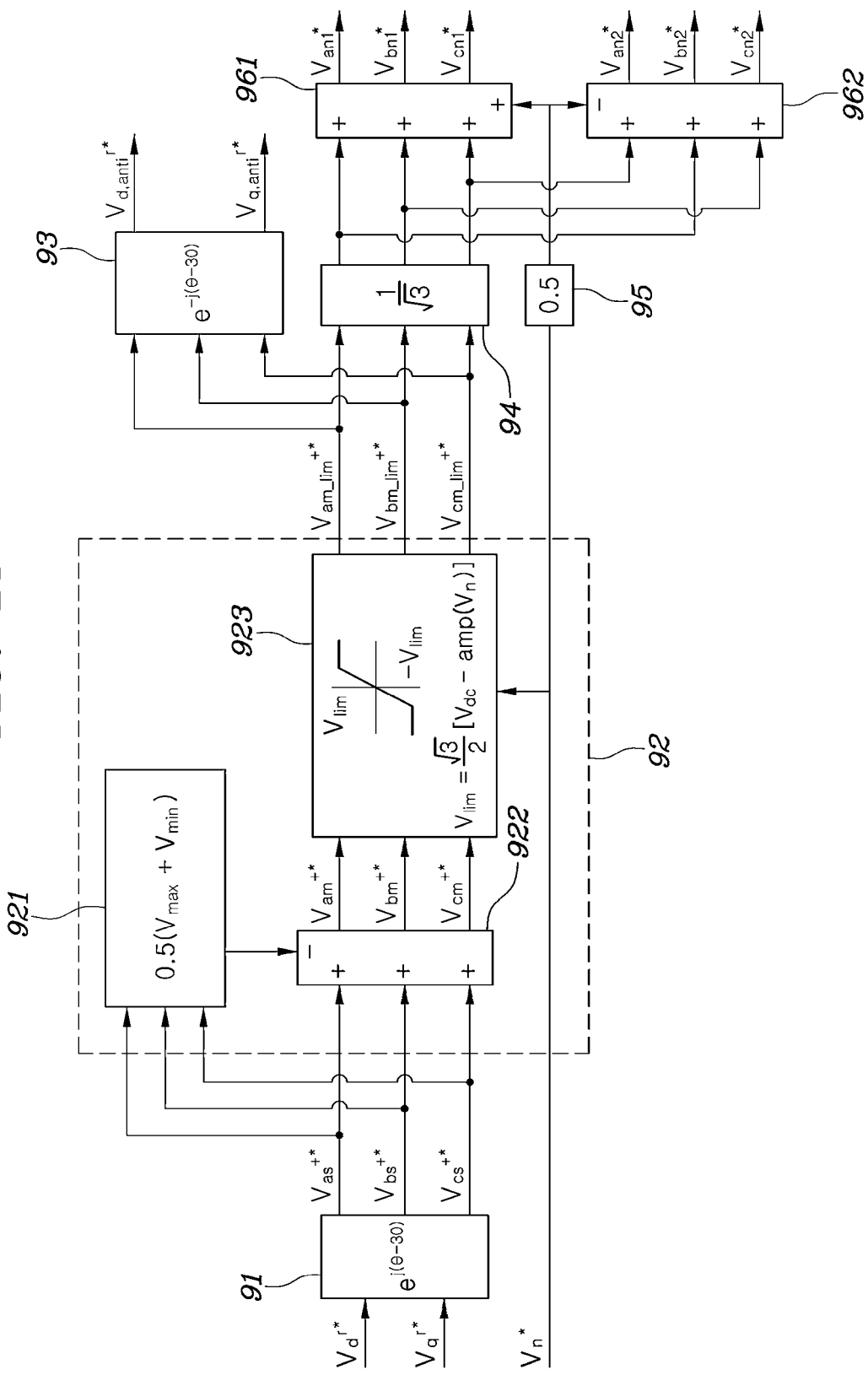
FIG. 14 is a block diagram of the controller which shows a space vector pulse width modulation unit shown in FIG. 13 in more detail.

FIG. 13 is a block diagram showing a controller applied to a motor driving apparatus according to various exemplary embodiments of the present disclosure in detail, and FIG. 14 is a block diagram of the controller which shows a space vector pulse width modulation unit shown in FIG. 13 in more detail.

Referring to FIG. 13 and FIG. 14, the controller 30 of the motor driving apparatus according to various exemplary embodiments of the present disclosure may include a coordinate transformation unit 91, a space vector pulse width modulation unit 92, a multiplication unit 94, a first pole voltage command generator 961, and a second pole voltage command generator 962. The example of the controller shown in FIG. 13 may include the current command map 81 and the current controller 82 included in the exemplary embodiment shown in FIG. 9. That is, in the exemplary embodiment of FIG. 13, the coordinate transformation unit 91 may operate by being provided with voltage commands $V_d^{r*}$ and $V_q^{r*}$ (dq voltage commands of the synchronous coordinate system) of the motor, generated by the current control unit 82 of the exemplary embodiment shown in FIG. 9.

The coordinate transformation unit 91 may receive the voltage commands $V_d^{r*}$ and $V_q^{r*}$ of the motor generated by the current controller and transform the same so that they lag behind the rotation angle θ of the motor by 30 degrees to generate phase voltage commands $V_{as}^{+*}$, $V_{bs}^{+*}$, and $V_{cs}^{+*}$ that lag behind the rotation angle θ of the motor by 30 degrees. The coordinate transformation performed by the coordinate transformation unit 91 may be performed by applying inverse Clarke/Park Transformation which is known technology.

The space vector pulse width modulation unit 92 may receive the phase voltage commands $V_{as}^{+*}$, $V_{bs}^{+*}$, and $V_{cs}^{+*}$ that lag behind the rotation angle θ of the motor, output from the coordinate transformation unit 91, and perform space vector pulse width modulation based thereon to generate limited pole voltage commands $V_{am\_lim}^{+*}$, $V_{bm\_lim}^{+*}$, and $V_{cm\_lim}^{+*}$ that lag behind the rotation angle θ of the motor by 30 degrees.

The space vector pulse width modulation unit 92 may include an offset voltage generator 921 that generates an offset voltage corresponding to the average of the maximum value and the minimum values of the phase voltage commands $V_{as}^{+*}$, $V_{bs}^{+*}$, and $V_{cs}^{+*}$ that lag behind the rotation angle θ of the motor by 30 degrees, a pole voltage command generator 922 that generates pole voltage commands $V_{am}^{+*}$, $V_{bm}^{+*}$, and $V_{cm}^{+*}$ that lag behind the rotation angle θ of the motor by 30 degrees by subtracting the offset voltage from the phase voltage commands $V_{as}^{+*}$, $V_{bs}^{+*}$, and $V_{cs}^{+*}$ that lag behind the rotation angle θ of the motor by 30 degrees, and a pole voltage command limiter 923 that limits the magnitudes of the pole voltage commands $V_{am}^{+*}$, $V_{bm}^{+*}$, and $V_{cm}^{+*}$ that lag behind the rotation angle θ of the motor by 30 degrees, generated by the pole voltage command generator 922, to generate limited pole voltage commands $V_{am\_lim}^{+*}$, $V_{bm\_lim}^{+*}$, and $V_{cm\_lim}^{+*}$ that lag behind the rotation angle θ of the motor by 30 degrees.

It is known that √3 times the output of a motor driven through a closed end winding method in which ends of one side of the motor windings are connected and one inverter connected to the ends of the other side thereof is switched can be obtained when the motor is driven through the open end winding method in which two inverters connected to both ends of the windings of the motor are switched. Therefore, in the exemplary embodiment shown in FIG. 13 and FIG. 14, the pole voltage command limiter 923 may limit the upper and lower limits of the pole voltage commands to "$(\sqrt{3}/2)^*V_{dc}$" instead of limiting the same to a DC link voltage $V_{dc}$ of the inverter. That is, the upper limit set by the pole voltage command limiter 923 may be "$+(\sqrt{3}/2)^*V_{dc}$" and the lower limit may be "$-(\sqrt{3}/2)^*V_{dc}$".

When the pole voltage command limiter 923 sets the upper limit to "$+(\sqrt{3}/2)^*V_{dc}$" and sets the lower limit to "$-(\sqrt{3}/2)^*V_{dc}$", a margin in which 0.5 times the zero-phase component voltage $V_n^*$ is added and subtracted in the subsequent stage may be insufficient. Accordingly, when the limit of a virtual pole voltage command is changed to $\pm\{(\sqrt{3}/2)^*V_{dc}\text{-amp}(V_n^*)\}$ (here, amp is an operator representing magnitude), voltage limit corresponding to the zero-phase component voltage command $V_n^*$ added to the subsequent stage can be reduced to secure a margin for the zero-phase component voltage command $V_n^*$ added later.

Because the output value of the first inverter 10 and the output value of the second inverter 20 have a magnitude of $1/\sqrt{3}$ as shown in FIG. 10, the multiplication unit 94 may perform operation of multiplying the limited pole voltage commands $V_{am\_lim}^{+*}$, $V_{bm\_lim}^{+*}$, and $V_{cm\_lim}^{+*}$ that lag behind the rotation angle θ of the motor by 30 degrees by 1/√3.

The first pole voltage command generator 961 may multiply the values output from the multiplication unit 94 by 0.5 times the zero-phase voltage command $V_n^*$ and sum the results to finally obtain a pole voltage command for the first inverter 10.

The second pole voltage command generator 962 may generate pole voltage commands for the second inverter 20. When the voltage of the first inverter 10 lags behind the motor voltage by 30 degrees, the voltage command of the second inverter 20 further lags behind the voltage of the first inverter by 120 degrees. This corresponds to shifting an a-phase command among the first pole voltage commands to a b-phase command shifting the b-phase command among the first pole voltage commands to a c-phase command, and shifting the c-phase command among the first pole voltage commands to the a-phase command.

That is, the second pole voltage command generator 962 may subtract 0.5 times the zero voltage command $V_n^*$ from the values output from the multiplication unit 94, determine a value obtained by subtracting half the zero voltage command $V_n^*$ from a value corresponding to the a-phase among the values output from the multiplication unit 94 as a b-phase pole voltage command of the second inverter 20, determine a value obtained by subtracting half the zero voltage command $V_n^*$ from a value corresponding to the b-phase among the values output from the multiplication unit 94 as a c-phase pole voltage command of the second inverter 20, and determine a value obtained by subtracting half the zero voltage command $V_n^*$ from a value corresponding to the c-phase among the values output from the multiplication unit 94 as an a-phase pole voltage command of the second inverter 20.

When the duties are generated based on the pole voltage commands output from the first pole voltage command generator 961 and the second pole voltage command generator 962, and switching of the switching elements in the first inverter 10 and the switching elements in the second inverter 20 is controlled, the voltage of the first inverter lags behind the motor voltage command by 30 degrees and the voltage of the second inverter and the voltage of the first inverter have a phase difference of 120 degrees therebetween as in the exemplary embodiment shown in FIG. 9, and thus zero phase current may be eliminated.

Because space vector pulse width modulation is performed based on the voltage commands of the motor and then pole voltage commands for the inverters are generated based on results output after space vector pulse width modulation in the exemplary embodiment shown in FIG. 13 and FIG. 14, it is possible to minimize the amount of determination for coordinate transformation as compared to the exemplary embodiment shown in FIG. 9, and thus it is possible to minimize discrete errors due to sine and cosine determinations during voltage modulation operation.

Figure 15:
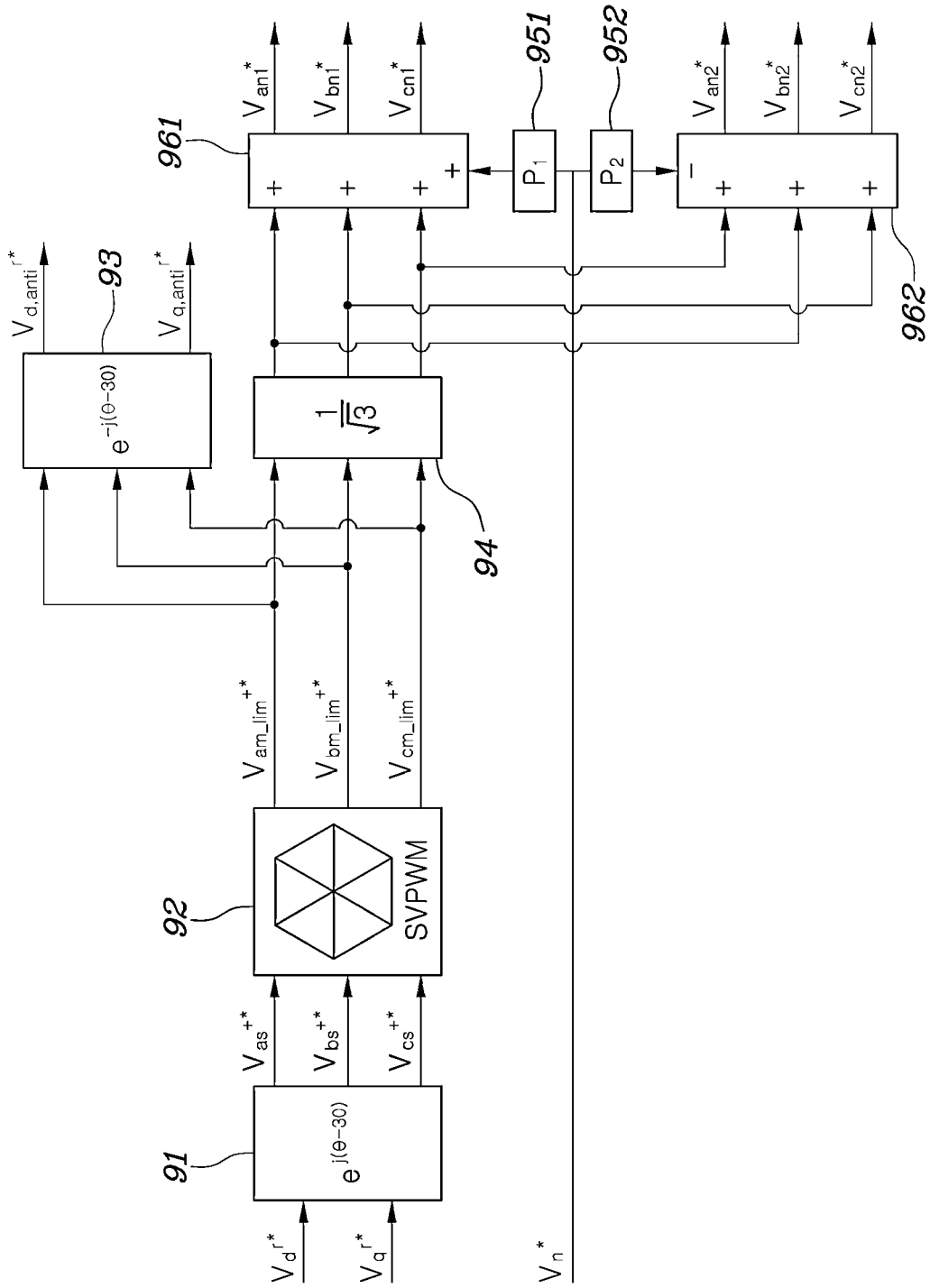
FIG. 15 is a block diagram showing a modified example of the controller of the exemplary embodiment shown in FIG. 13.

Although the multiplication unit 95 for multiplying the zero-phase voltage command $V_n^*$ by 0.5 is applied in FIG. 13 and FIG. 14, different zero-phase voltage commands $V_n^*$ may be distributed for the respective inverters as shown in FIG. 15.

FIG. 15 is a block diagram showing a modified example of the controller of the exemplary embodiment shown in FIG. 13.

Referring to FIG. 15, the multiple value $P_1$ for the zero-phase voltage command added to the first pole voltage command generator 961 and the multiple value $P_2$ for the zero-phase voltage command added to the second pole voltage command generator 962 may be determined as different values. Here, the sum of the two multiple values may be 1 ($P_1+P_2=1$).

As already described in the exemplary embodiment of FIG. 9, because distribution of the zero-phase voltage command $V_n^*$ does not affect the motor output, the zero-phase voltage command is the same for the motor. If the two inverters are provided a degree of freedom for distribution of the zero-phase voltage commands, a means for adjusting the maximum values of the duties which become different from each other due to an error present in the inverters, such as the dead time, to the same value can be provided, which can increase the motor output.

That is, according to the exemplary embodiment shown in FIG. 15, it is possible to appropriately solve problems caused by errors inevitably generated in the inverters by tuning the multiple values $P_1$ and $P_2$ to improve the motor output.

In FIG. 13 to FIG. 15, reference numeral 93 denotes an anti-windup operation unit of generating a signal which is fed back to an integration controller (corresponding to the current controller 82 of FIG. 9).

In the exemplary embodiment shown in FIG. 13 to FIG. 15, the voltage commands $V_d^{r*}$ and $V_q^{r*}$ of the motor corresponding to the output of the current controller 82 are limited by the pole voltage command limiter 923 in the space vector pulse width modulation unit 92, and then switching control for each inverter is performed by limited commands. That is, for the current controller 82 to perform accurate feedback control, the current controller 82 needs to receive feedback of a degree of limitation of the voltage command output therefrom when the voltage command is applied to actual inverter control.

The anti-windup operation unit 93 may perform Clarke/Park transformation on the limited pole voltage commands $V_{am\_lim}^{+*}$, $V_{bm\_lim}^{+*}$, and $V_{cm\_lim}^{+*}$ that lag behind the rotation angle θ of the motor by 30 degrees and feed back the result to the current controller.

Furthermore, in another exemplary embodiment of the present disclosure, the voltage of the first inverter 10 may precede the voltage command of the motor by 30 degrees. In the instant case, the voltage of the second inverter 20 may precede the voltage of the first inverter 10 by 120 degrees. Accordingly, the second pole voltage command generator 962 may add 0.5 times the zero-phase voltage command $V_n^*$ to the values output from the multiplication unit 94 and sum the results, determine a value obtained by adding half the zero-phase voltage command $V_n^*$ to the value corresponding to the a-phase among the values output from the multiplication unit 94 as a c-phase pole voltage command of the second inverter 20, determine a value obtained by adding half the zero-phase voltage command $V_n^*$ to the value corresponding to the b-phase among the values output from the multiplication unit 94 as an a-phase pole voltage command of the second inverter 20, and determine a value obtained by adding half the zero-phase voltage command $V_n^*$ to the value corresponding to the c-phase among the values output from the multiplication unit 94 as a b-phase pole voltage command of the second inverter 20.

The voltage phase relationship between the first inverter and the second inverter is illustrated in FIG. 10. Although FIG. 10 shows an example in which the voltage of the first inverter precedes the motor voltage by 30 degrees, those skilled in the art can infer and implement an exemplary embodiment in which the voltage of the first inverter lag behinds the motor voltage by 30 degrees through the example of FIG. 10.

According to the above-described motor driving apparatus, it is possible to curb generation of a common mode current by controlling zero-phase component voltages of two inverters applied to the open end winding method as desired.

Therefore, according to the motor driving apparatus, it is possible to facilitate control of motor current by preventing a motor phase current from being distorted by the common mode current, and it is possible to significantly improve the driving efficiency of the motor and to prevent motor damage in advance by preventing loss of the motor, such as iron loss and copper loss, caused by circulating current.

According to the motor driving apparatus, it is possible to remove even motor loss due to instantaneous ripples of zero-phase component current (common mode current) by controlling the zero-phase component voltage to instantaneously become zero at the time of driving the open end winding type motor.

Furthermore, according to the motor driving apparatus, because space vector pulse width modulation is first performed based on the voltage command of the motor and then the pole voltage command for each inverter is generated based on the output results, the amount of determination for coordinate transformation may be minimized, and thus a discrete error due to sine and cosine determinations during voltage modulation operation may be minimized.

The effects which may be obtained in an exemplary embodiment of the present disclosure are not limited to the above-mentioned effects, and other effects that are not mentioned may be clearly understood by those of ordinary skill in the art from the following description.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving apparatus of driving a motor including a plurality of windings respectively corresponding to a plurality of phases, the motor driving apparatus comprising:
a first inverter including a plurality of first switching elements and connected to a first end of each of the windings;
a second inverter including a plurality of second switching elements and connected to a second end of each of the windings; and
a controller electrically connected to the first switching elements and the second switching elements and configured to generate limited pole voltage commands by integrated space vector pulse width modulation for both the first inverter and the second inverter based on preset voltage commands of the motor and to distribute the limited pole voltage commands to generate first pole voltage commands for switching of the first switching elements and second pole voltage commands for switching of the second switching elements.

2. The motor driving apparatus of claim 1, wherein the controller is configured to perform inverse Clarke/Park transformation on the voltage commands of the motor so that the voltage commands precede or lag behind a rotation angle of the motor by 30 degrees to generate phase voltage commands for the respective phases to generate the limited pole voltage commands.

3. The motor driving apparatus of claim 2, wherein the controller is configured to generate an offset voltage corresponding to an average of a maximum value and a minimum value among the phase voltage commands and to subtract the offset voltage from the phase voltage commands to generate the limited extreme voltage commands.

4. The motor driving apparatus of claim 3, wherein an upper limit of the limited pole voltage commands is $(\sqrt{3}/2)*\text{Vdc-amp}(V_n^*)$ and a lower limit of the limited pole voltage commands is $-\{(\sqrt{3}/2)*\text{Vdc-amp}(V_n^*)\}$,
wherein Vdc is a DC link voltage of the first inverter and the second inverter,
wherein $V_n^*$ is a zero-phase component of the voltage commands of the motor, and
wherein amp is an operator indicating magnitude.

5. The motor driving apparatus of claim 3, wherein the controller is configured to multiply the limited pole voltage commands by $1/\sqrt{3}$ and to add $P_1$ times the zero-phase component of the voltage commands of the motor to the limited pole voltage commands multiplied by $1/\sqrt{3}$ to generate the first pole voltage commands, and to subtract $P_2$ times the zero-phase component of the voltage commands of the motor from the limited pole voltage commands multiplied by $1/\sqrt{3}$ to generate the second pole voltage commands,
wherein summation of the $P_1$ and the $P_2$ is equal to 1.

6. The motor driving apparatus of claim 5, wherein $P_1$ and $P_2$ have different values.

7. The motor driving apparatus of claim 5, wherein, when the controller has performed inverse Clarke/Park transformation for preceding the rotation angle of the motor by 30 degrees, the controller is configured to determine a-phase, b-phase and c-phase components of the first pole voltage commands so that the a-phase, b-phase and c-phase components of the first pole voltage commands respectively correspond to a-phase, b-phase and c-phase components of the limited pole voltage commands, and to determine a-phase, b-phase and c-phase components of the second pole voltage commands so that the a-phase, b-phase and c-phase components of the second pole voltage commands respectively correspond to the b-phase, c-phase and a-phase components of the limited pole voltage commands.

8. The motor driving apparatus of claim 5, wherein, when the controller has performed inverse Clarke/Park transformation for preceding the rotation angle of the motor by 30 degrees, the controller is configured to add $P_1$ times the zero-phase component of the voltage commands of the motor to values obtained by multiplying the a-phase, b-phase and c-phase components of the limited pole voltage commands by $1/\sqrt{3}$ to generate the a-phase, b-phase and c-phase components of the first pole voltage commands, and configured to subtract $P_2$ times the zero-phase component of the voltage commands of the motor from values obtained by multiplying the b-phase, c-phase and a-phase components of the limited pole voltage commands by $1/\sqrt{3}$ to generate the a-phase, b-phase and c-phase components of the second pole voltage commands.

9. The motor driving apparatus of claim 5, wherein, when the controller has performed inverse Clarke/Park transformation for lagging behind the rotation angle of the motor by 30 degrees, the a-phase, b-phase and c-phase components of the first pole voltage commands respectively correspond to a-phase, b-phase and c-phase components of the limited pole voltage commands, and the a-phase, b-phase and c-phase components of the second pole voltage commands respectively correspond to the c-phase, a-phase and b-phase components of the limited pole voltage commands.

10. The motor driving apparatus of claim 5, wherein, when the controller has performed inverse Clarke/Park transformation for lagging behind the rotation angle of the motor by 30 degrees, the controller is configured to add $P_1$ times the zero-phase component of the voltage commands of the motor to values obtained by multiplying the a-phase, b-phase and c-phase components of the limited pole voltage commands by $1/\sqrt{3}$ to generate the a-phase, b-phase and c-phase components of the first pole voltage commands, and configured to subtract $P_2$ times the zero-phase component of the voltage commands of the motor from values obtained by multiplying the c-phase, a-phase and b-phase components of the limited pole voltage commands by $1/\sqrt{3}$ to generate the a-phase, b-phase and c-phase components of the second pole voltage commands.

11. The motor driving apparatus of claim 1, wherein an upper limit of the limited pole voltage commands is $(\sqrt{3}/2)*\text{Vdc}$ and a lower limit of the limited pole voltage commands is $-(\sqrt{3}/2)*\text{Vdc}$,
wherein Vdc is a DC link voltage of the first inverter and the second inverter.

12. A method of controlling a motor driving apparatus of driving a motor including a plurality of windings respectively corresponding to a plurality of phases, a first inverter including a plurality of first switching elements and connected to a first end of each of the windings, and a second inverter including a plurality of second switching elements and connected to a second end of each of the windings, the method comprising:
generating, by a controller electrically connected to the first switching elements and the second switching elements, limited pole voltage commands by integrated space vector pulse width modulation for both the first inverter and the second inverter based on preset voltage commands of the motor; and
distributing the limited pole voltage commands to generate first pole voltage commands for switching of the first switching elements and second pole voltage commands for switching of the second switching elements.

13. The method of claim 12,
wherein the controller is configured to perform inverse Clarke/Park transformation on the voltage commands of the motor so that the voltage commands precede or lag behind a rotation angle of the motor by 30 degrees to generate phase voltage commands for the respective phases to generate the limited pole voltage commands, and
wherein the controller is configured to generate an offset voltage corresponding to an average of a maximum value and a minimum value among the phase voltage commands and to subtract the offset voltage from the phase voltage commands to generate the limited extreme voltage commands.

14. The method of claim 13, wherein an upper limit of the limited pole voltage commands is $(\sqrt{3}/2)*\text{Vdc-amp}(V_n^*)$ and a lower limit of the limited pole voltage commands is $-\{(\sqrt{3}/2)*\text{Vdc-amp}(V_n^*)\}$, wherein Vdc is a DC link voltage of the first inverter and the second inverter, wherein $V_n^*$ is a zero-phase component of the voltage commands of the motor, and wherein amp is an operator indicating magnitude.

15. The method of claim 13, wherein the controller is configured to multiply the limited pole voltage commands by $1/\sqrt{3}$ and to add $P_1$ times the zero-phase component of the voltage commands of the motor to the limited pole voltage commands multiplied by $1/\sqrt{3}$ to generate the first pole voltage commands, and to subtract $P_2$ times the zero-phase component of the voltage commands of the motor from the limited pole voltage commands multiplied by $1/\sqrt{3}$ to generate the second pole voltage commands, wherein summation of the $P_1$ and the $P_2$ is equal to 1, wherein $P_1$ and $P_2$ have different values.

16. The method of claim 15, wherein, when the controller has performed inverse Clarke/Park transformation for preceding the rotation angle of the motor by 30 degrees, the controller is configured to determine a-phase, b-phase and c-phase components of the first pole voltage commands so that the a-phase, b-phase and c-phase components of the first pole voltage commands respectively correspond to a-phase, b-phase and c-phase components of the limited pole voltage commands, and to determine a-phase, b-phase and c-phase components of the second pole voltage commands so that the a-phase, b-phase and c-phase components of the second pole voltage commands respectively correspond to the b-phase, c-phase and a-phase components of the limited pole voltage commands.

17. The method of claim 15, wherein, when the controller has performed inverse Clarke/Park transformation for preceding the rotation angle of the motor by 30 degrees, the controller is configured to add $P_1$ times the zero-phase component of the voltage commands of the motor to values obtained by multiplying the a-phase, b-phase and c-phase components of the limited pole voltage commands by $1/\sqrt{3}$ to generate the a-phase, b-phase and c-phase components of the first pole voltage commands, and configured to subtract $P_2$ times the zero-phase component of the voltage commands of the motor from values obtained by multiplying the b-phase, c-phase and a-phase components of the limited pole voltage commands by $1/\sqrt{3}$ to generate the a-phase, b-phase and c-phase components of the second pole voltage commands.

18. The method of claim 15, wherein, when the controller has performed inverse Clarke/Park transformation for lagging behind the rotation angle of the motor by 30 degrees, the a-phase, b-phase and c-phase components of the first pole voltage commands respectively correspond to a-phase, b-phase and c-phase components of the limited pole voltage commands, and the a-phase, b-phase and c-phase components of the second pole voltage commands respectively correspond to the c-phase, a-phase and b-phase components of the limited pole voltage commands.

19. The method of claim 15, wherein, when the controller has performed inverse Clarke/Park transformation for lagging behind the rotation angle of the motor by 30 degrees, the controller is configured to add $P_1$ times the zero-phase component of the voltage commands of the motor to values obtained by multiplying the a-phase, b-phase and c-phase components of the limited pole voltage commands by $1/\sqrt{3}$ to generate the a-phase, b-phase and c-phase components of the first pole voltage commands, and configured to subtract $P_2$ times the zero-phase component of the voltage commands of the motor from values obtained by multiplying the c-phase, a-phase and b-phase components of the limited pole voltage commands by $1/\sqrt{3}$ to generate the a-phase, b-phase and c-phase components of the second pole voltage commands.

20. The method of claim 12, wherein an upper limit of the limited pole voltage commands is $(\sqrt{3}/2)*Vdc$ and a lower limit of the limited pole voltage commands is $-(\sqrt{3}/2)*Vdc$, wherein Vdc is a DC link voltage of the first inverter and the second inverter.

\* \* \* \* \*